(12) United States Patent
Kim et al.

(10) Patent No.: US 12,198,586 B2
(45) Date of Patent: Jan. 14, 2025

(54) DISPLAY DEVICE AND METHOD OF DRIVING THE SAME

(71) Applicant: SAMSUNG DISPLAY CO., LTD., Yongin-si (KR)

(72) Inventors: Jong Bin Kim, Yongin-si (KR); Bo Young An, Yongin-si (KR)

(73) Assignee: SAMSUNG DISPLAY CO., LTD, Yongin-si (KR)

( * ) Notice: Subject to any disclaimer, the term of this patent is extended or adjusted under 35 U.S.C. 154(b) by 0 days.

(21) Appl. No.: 18/484,863

(22) Filed: Oct. 11, 2023

(65) Prior Publication Data

US 2024/0169872 A1   May 23, 2024

(30) Foreign Application Priority Data

Nov. 18, 2022 (KR) .................. 10-2022-0155503

(51) Int. Cl.
| | | |
|---|---|---|
| G09G 3/32 | (2016.01) | |
| G09G 3/00 | (2006.01) | |
| G09G 3/3233 | (2016.01) | |
| G06V 10/147 | (2022.01) | |

(52) U.S. Cl.
CPC ............... *G09G 3/006* (2013.01); *G09G 3/32* (2013.01); *G06V 10/147* (2022.01); *G09G 2300/0842* (2013.01); *G09G 2310/0278* (2013.01)

(58) Field of Classification Search
None
See application file for complete search history.

(56) References Cited

U.S. PATENT DOCUMENTS

| | | | |
|---|---|---|---|
| 10,019,950 B2 | 7/2018 | Tani et al. | |
| 11,645,979 B2* | 5/2023 | Lee | G06F 3/147 |
| | | | 345/694 |
| 2010/0188320 A1* | 7/2010 | Min | G09G 3/3291 |
| | | | 345/80 |
| 2014/0176516 A1* | 6/2014 | Kim | G09G 3/3233 |
| | | | 345/204 |
| 2017/0193877 A1* | 7/2017 | Lee | G09G 3/3291 |
| 2018/0053462 A1* | 2/2018 | Bae | G09G 3/2074 |
| 2018/0061293 A1* | 3/2018 | Park | G09G 3/3233 |
| 2019/0189038 A1* | 6/2019 | Park | G09G 3/3225 |
| 2020/0043421 A1* | 2/2020 | Kang | G09G 3/3275 |

(Continued)

FOREIGN PATENT DOCUMENTS

| | | |
|---|---|---|
| KR | 10-2052751 | 11/2019 |
| KR | 10-2239898 | 4/2021 |

(Continued)

*Primary Examiner* — Sepehr Azari

(74) *Attorney, Agent, or Firm* — F. Chau & Associates, LLC

(57) ABSTRACT

A display device of the disclosure includes a display panel including pixels, a first sensor configured to sense mobility of the pixels, and a second sensor. The first sensor generates an initial sensing value using a first process to sense the mobility during a first time period from a power-on time point of the display device to a display start time point, and generates a first sensing value using a second process to sense the mobility after the display start time point. The second sensor senses whether the display panel is an abnormal state based on the initial sensing value and the first sensing value.

20 Claims, 17 Drawing Sheets

(56) References Cited

U.S. PATENT DOCUMENTS

2020/0312246 A1* 10/2020 Xu ..................... G09G 3/3233
2021/0383763 A1* 12/2021 Kim ................... H10K 59/131
2022/0139325 A1    5/2022 Lee et al.

FOREIGN PATENT DOCUMENTS

| KR | 10-2022-0060291 | 5/2022 |
| KR | 10-2406975 | 6/2022 |
| KR | 10-2023-0135217 | 9/2023 |

* cited by examiner

DISPLAY DEVICE AND METHOD OF DRIVING THE SAME

CROSS-REFERENCE TO RELATED APPLICATION

This U.S. non-provisional patent application claims priority under 35 U.S.C. § 119 to Korean Patent Application No. 10-2022-0155503, filed on Nov. 18, 2022, the disclosure of which is incorporated by reference in its entirety herein.

1. Technical Field

The disclosure relates to a display device and a method of driving the same.

2. Discussion of Related Art

As information technology develops, importance of a display device, which is a connection medium between a user and information, is emphasized. Accordingly, use of a display device such as a liquid crystal display device, and an organic light emitting display device is increasing.

When a crack occurs in a display panel of the display device, an internal line may be shorted, an overcurrent may flow through the shorted line, and damage to the display device may occur due to the overcurrent. However, it may be difficult to sense such an abnormal state quick enough to prevent the damage.

SUMMARY

At least one embodiment provides a display device and a method of driving the same capable of more quickly sensing an abnormal state of a display device.

According to an embodiment of the disclosure, a display device includes a display panel including pixels, a first sensor configured to sense mobility of the pixels, and a second sensor. The first sensor generates an initial sensing value using a first process to sense the mobility during a first period from a power-on time point of the display device to a display start time point, and generates a first sensing value using a second process to sense the mobility after the display start time point. The second sensor senses whether the display panel is in an abnormal state based on the initial sensing value and the first sensing value.

A processing time of the first process may be shorter than a processing time of the first mobility sensing process.

The display device may further include a scan driver connected to the pixels through scan lines, and the scan driver may sequentially supply scan signals to the scan lines while the first process is performed.

The first sensor may perform the second process during blank periods positioned between active periods, and the scan driver may supply the scan signals to the scan lines different from each other during the blank periods different from each other while the second process is performed.

The display device may further include a data driver connected to the pixels through data lines, and the data driver may first supply sensing voltages to the data lines and then supply data voltages to the data lines during each of the blank periods while the second process is performed.

The data voltages supplied during the blank periods may be the same as some of the data voltages supplied during previous active periods.

In an embodiment, the data driver successively supplies the sensing voltages and does not supply the data voltages while the first process is performed.

The second sensor may include a selection circuit configured to select one of a first mode and a second mode according to a number of times a process is performed to sense the mobility.

The selection circuit may select the first mode when only the first process and the second process are performed, and may select the second mode when a process is performed to sense the mobility after the second process is performed.

The second sensor may further include a calculator calculating a difference value between the initial sensing value and the first sensing value during the first mode and calculating the difference value between sensing values generated in two recent mobility sensing processes during the second mode.

The second sensor may further include a first logic circuit designating corresponding pixels as abnormal pixel candidates when the difference value is greater than a first threshold value.

The second sensor may further include a second logic circuit determining the abnormal pixel candidates as abnormal pixels when sensing values corresponding to the abnormal pixel candidates are greater than a second threshold value.

The second sensor may further include a third logic circuit determining that the display panel is in the abnormal state when the number of the abnormal pixels is greater than a first count threshold value and determining that the pixel unit is in a normal state when the number of the abnormal pixels is less than the first count threshold value.

The second sensor may further include a first counter generating a first abnormal condition value when the number of the abnormal pixels is greater than a first count threshold value, a second counter generating a second abnormal condition value when the number of the abnormal pixels belonging to a first pixel group connected to different scan lines and one data line is greater than a second count threshold value, and a third counter generating a third abnormal condition value when the number of the abnormal pixels belonging to a second pixel group positioned in a partial area of the display panel and connected to a plurality of scan lines and a plurality of data lines is greater than a third count threshold value, and the second sensor may determine that the display panel is in the abnormal state when at least one of the first abnormal condition value, the second abnormal condition value, and the third abnormal condition value is generated.

According to an embodiment of the disclosure, a method of driving a display device includes generating an initial sensing value using a first process to sense a mobility of pixels of a display panel of the display device during a first period from a power-on time point of the display device to a display start time point, generating a first sensing value using a second process to sense the mobility after the display start point, and sensing whether the display panel is in an abnormal state based on the initial sensing value and the first sensing value.

A processing time of the first process may be shorter than a processing time of the second process.

The method may further include sequentially supplying scan signals to scan lines connected to pixels of the pixel unit while performing the first process.

The first mobility sensing process may be performed during blank periods positioned between active periods, and the method may further include supplying the scan signals to the scan lines different from each other during the blank periods different from each other while the second process is performed.

The method may further include, supplying sensing voltages to data lines connected to the pixels during each of the blank periods in the first mobility sensing process, and then, supplying data voltages to the data lines.

The data voltages supplied during the blank periods may be the same as some of the data voltages supplied during previous active periods.

A display device and a method of driving the same according to at least one embodiment of the disclosure may more quickly sense an abnormal state of a display device.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION OF THE EMBODIMENTS

Figure 1:
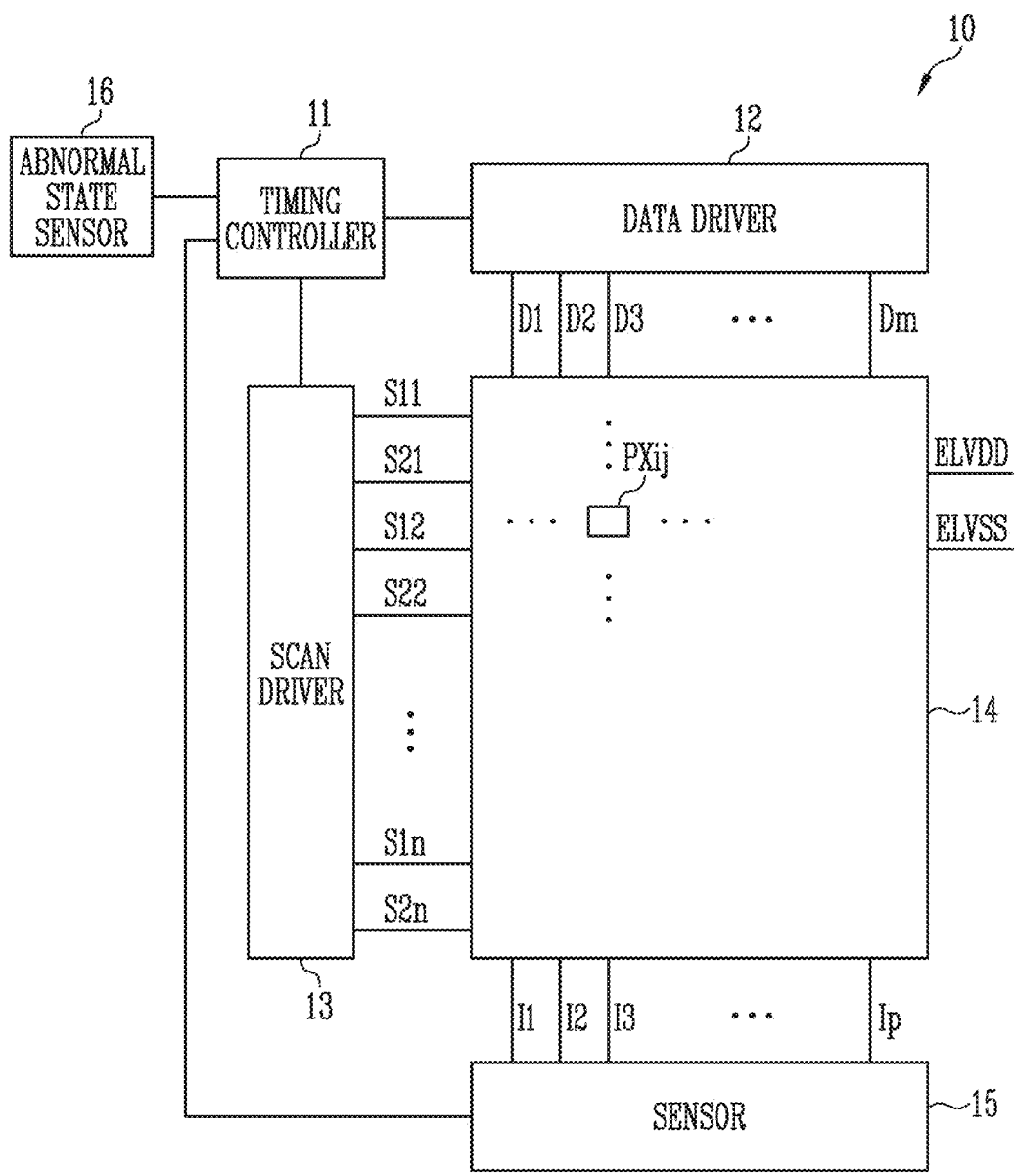
FIG. 1 is a diagram illustrating a display device according to an embodiment of the disclosure.

Hereinafter, various embodiments of the disclosure will be described in detail with reference to the accompanying drawings so that those skilled in the art may carry out the disclosure. The disclosure may be implemented in various different forms and is not limited to the embodiments described herein.

The same or similar elements are denoted by the same reference numerals throughout the specification. Therefore, the reference numerals described herein may be used in other drawings.

In addition, an expression "is the same" in the description may mean "is substantially the same". That is, the expression "is the same" may be the same enough for those of ordinary skill to understand that it is the same. Other expressions may also be expressions in which "substantially" is omitted.

FIG. 1 is a diagram illustrating a display device according to an embodiment of the disclosure.

A display device 10 according to an embodiment of the disclosure may include a timing controller 11 (e.g., a control circuit), a data driver 12 (e.g., a driver circuit), a scan driver 13 (e.g., a driver circuit), a pixel unit 14 (e.g., a display panel), a sensor 15 (e.g., a first sensing device or circuit), and an abnormal state sensor 16 (e.g., a second sensing device or circuit).

The timing controller 11 may receive grayscale values and control signals for each image frame from an external processor. The timing controller 11 may compensate the grayscale values based on sensing values provided by the sensor 15 to generate compensated grayscale values and provide the compensated grayscale values to the data driver 12. The timing controller 11 may provide control signals suitable for each specification to the data driver 12, the scan driver 13, the sensor 15, and the like.

The data driver 12 may generate data voltages to be provided to data lines D1, D2, D3, ..., and Dm using the grayscale values and the control signals. For example, the data driver 12 may sample the grayscale values using a clock signal and apply the data voltages corresponding to the grayscale values to the data lines D1 to Dm in a pixel row unit (e.g., a pixel row of the display panel 14). Here, m may be an integer greater than 0.

The scan driver 13 may receive a clock signal, a scan start signal, and the like from the timing controller 11, and generate first scan signals to be provided to first scan lines S11, S12, ..., and S1n and second scan signals to be provided to second scan lines S21, S22, ..., and S2n. Here, n may be an integer greater than 0.

The scan driver 13 may sequentially supply first scan signals having a turn-on level of a pulse to the first scan lines S11, S12, ..., and S1n. In addition, the scan driver 13 may sequentially supply second scan signals having a turn-on level of a pulse to the second scan lines S21, S22, ..., and S2n.

For example, the scan driver 13 may include a first scan driver connected to the first scan lines S11, S12, ..., and S1n and a second scan driver connected to the second scan lines S21, S22, ..., and S2n. Each of the first scan driver and the second scan driver may include scan stages configured in a form of a shift register. Each of the first scan driver and the second scan driver may generate scan signals in a method of sequentially transferring a scan start signal having a form of a turn-on level of a pulse to a next scan stage according to control of a clock signal.

The display panel 14 includes pixels. Each pixel PXij may be connected to corresponding data line, scan line, and sensing line. Pixels connected to the same scan line and sensing line may be defined as a pixel row.

The sensor 15 may receive a control signal from the timing controller 11 and supply an initialization voltage to sensing lines I1, I2, I3, ..., and Ip or receive a sensing signal from the sensing lines I1, I2, I3, ..., and Ip. For example, the sensor 15 may supply the initialization voltage to the sensing lines I1, I2, I3, . . . , and Ip during at least a portion of a display period. For example, the sensor 15 may receive the sensing signal from the sensing lines I1, I2, I3, . . . , and Ip during at least a portion of a sensing period. Here, p may be an integer greater than 0. The sensor 15 may provide sensing values corresponding to the sensing signals to the timing controller 11 or the abnormal state sensor 16. The sensing values may correspond to a threshold voltage of a driving transistor of each pixel, a mobility, a threshold voltage of a light emitting element, and the like. At least one of the following embodiments is described based on the assumption that the sensor 15 is configured to sense a mobility of the pixels. For example, the mobility of a pixel may correspond to the mobility of a transistor of the pixel.

The sensor 15 may include sensing channels connected to the sensing lines I1, I2, I3, . . . , and Ip. For example, the sensing lines I1, I2, I3, . . . , and Ip and the sensing channels may correspond one to one.

The abnormal state sensor 16 may sense whether the pixel unit 14 is in an abnormal state based on the mobility. For example, the abnormal state may be a state in which an internal line of the display panel 14 is shorted and thus an overcurrent flows. In another example, the abnormal state may be a state in which the internal line of the display panel 14 is open and thus the display device 10 may not properly operate. According to an embodiment, when the abnormal state sensor 16 senses the abnormal state of the display panel 14, the abnormal state sensor 16 shuts down the display device 10.

According to an embodiment, the abnormal state sensor 16 may be configured as an integrated circuit (IC) integrated with the timing controller 11. According to an embodiment, the abnormal state sensor 16 may be configured as an IC integrated with the data driver 12. According to an embodiment, the abnormal state sensor 16 may be configured as an IC integrated with the timing controller 11 and the data driver 12. According to an embodiment, the abnormal state sensor 16 may be configured as an IC integrated with an external processor. At this time, the external processor may be an application processor, a central processing unit (CPU), a graphics processing unit (GPU), or the like.

Figure 2:
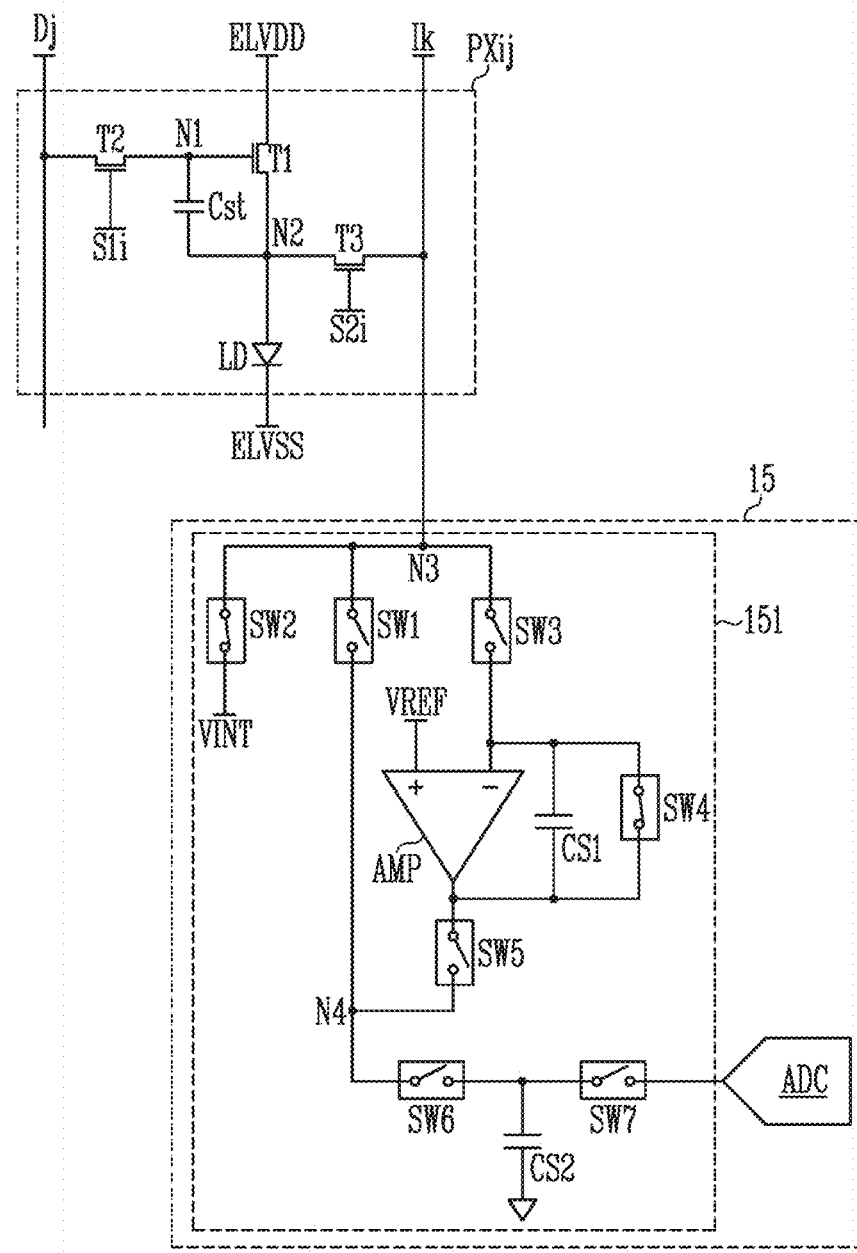
FIGS. 2 and 3 are diagrams illustrating a method of driving a pixel and a sensing channel in a display period according to an embodiment of the disclosure.
Figure 3:
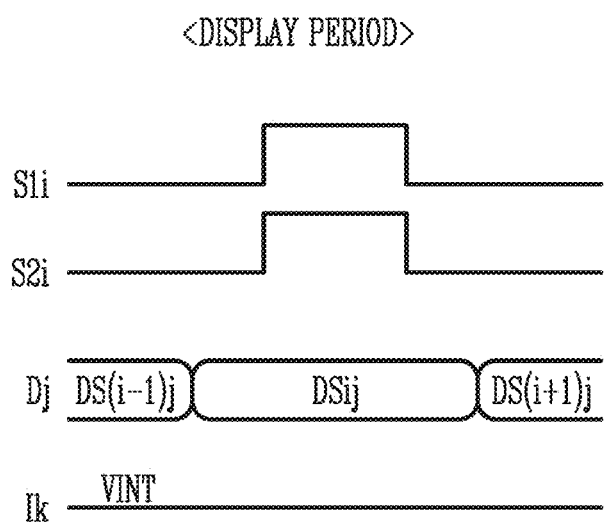

FIGS. 2 and 3 are diagrams illustrating a method of driving a pixel and a sensing channel in a display period according to an embodiment of the disclosure.

First, an exemplary configuration of a pixel PXij and a sensing channel 151 of the sensor 15 is described with reference to FIG. 2.

The pixel PXij may include transistors T1, T2, and T3, a storage capacitor Cst, and a light emitting element LD.

The transistors T1, T2, and T3 may be configured as N-type transistors. In another embodiment, the transistors T1, T2, and T3 may be configured as P-type transistors. In another embodiment, the transistors T1, T2, and T3 may be configured as a combination of an N-type transistor and a P-type transistor. The P-type transistor collectively refers to a transistor in which an amount of conducting current increases when a voltage difference between a gate electrode and a source electrode increases in a negative direction. The N-type transistor collectively refers to a transistor in which an amount of conducting current increases when a voltage difference between a gate electrode and a source electrode increases in a positive direction. A transistor may be configured in various forms such as a thin film transistor (TFT), a field effect transistor (FET), and a bipolar junction transistor (BJT).

The first transistor T1 may have a gate electrode connected to a first node N1, a first electrode connected to first power ELVDD, and a second electrode connected to a second node N2. The first transistor T1 may be referred to as a driving transistor.

The second transistor T2 may have a gate electrode connected to a first scan line S1$i$, a first electrode connected to a data line Dj, and a second electrode connected to the first node N1. The second transistor T2 may be referred to as a scanning transistor.

The third transistor T3 may have a gate electrode connected to a second scan line S2$i$, a first electrode connected to the second node N2, and a second electrode connected to a sensing line Ik. The third transistor T3 may be referred to as a sensing transistor.

The storage capacitor Cst may have a first electrode connected to the first node N1 and a second electrode connected to the second node N2.

The light emitting element LD may have an anode connected to the second node N2 and a cathode connected to second power ELVSS. The light emitting element LD may be configured as an organic light emitting diode, an inorganic light emitting diode, a quantum dot/well light emitting diode, or the like. Meanwhile, the pixel PXij of FIG. 2 is illustratively shown to include one light emitting element LD, but in another embodiment, the pixel PXij may include a plurality of light emitting elements connected in series, in parallel, or in series and parallel.

In general, a voltage of the first power ELVDD may be greater than a voltage of the second power ELVSS. However, in a special situation such as preventing the light emitting diode LD from emitting light, the voltage of the second power ELVSS may be set higher than the voltage of the first power ELVDD.

The sensing channel 151 may include switches SW1 to SW7, a sensing capacitor CS1, an amplifier AMP, and a sampling capacitor CS2.

The second switch SW2 may have one end connected to a third node N3 and another end connected to initialization power VINT.

A first input terminal (for example, a non-inverting terminal) of the amplifier AMP may be connected to reference power VREF (e.g., a reference voltage). The amplifier AMP may be implemented by an operational amplifier.

The third switch SW3 may have one end connected to the third node N3 and another end connected to a second input terminal (for example, an inverting terminal) of the amplifier AMP.

The sensing capacitor CS1 may have a first electrode connected to the second input terminal of the amplifier AMP and a second electrode connected to an output terminal of the amplifier AMP.

The sampling capacitor CS2 may be connected to the sensing capacitor CS1 through at least one or more switches SW5 and SW6. One end of the sampling capacitor CS2 may be connected to a node receiving a ground voltage.

The fourth switch SW4 may have one end connected to the first electrode of the sensing capacitor CS1 and another end connected to the second electrode of the sensing capacitor CS1.

The fifth switch SW5 may have one end connected to the output terminal of the amplifier AMP and another end connected to a fourth node N4.

The sixth switch SW6 may have one end connected to the fourth node N4 and another end connected to a first electrode of the sampling capacitor CS2.

The seventh switch SW7 may have one end connected to the first electrode of the sampling capacitor CS2 and another end connected to an analog-to-digital converter ADC.

The first switch SW1 may have one end connected to the third node N3 and another end connected to the fourth node N4.

The sensor 15 (e.g., a first sensor) may include the sensing channel 151 and the analog-to-digital converter ADC. For example, the sensor 15 may include analog-to-digital converters corresponding to the number of sensing channels. In another example, the sensor 15 may include a single analog-to-digital converter and convert sampling signals, which are stored in the sensing channels, in a time-division method.

Referring to FIG. 3, an exemplary waveform of signals applied to the scan lines S1i and S2i, the data line Dj, and the sensing line Ik connected to the pixel PXij during the display period is shown. Here, k may be an integer greater than 0.

During the display period, the sensing line Ik is connected to the initialization power VINT. During the display period, the second switch SW2 may be turned on.

During the display period, the first switch SW1 and the third switch SW3 may be turned off. Therefore, the sensing line Ik may be prevented from being connected to another power VREF.

During the display period, data voltages DS(i−1)j, DSij, and DS(i+1)j may be sequentially applied to the data line Dj in a horizontal period unit. A turn-on level (high level) of scan signal may be applied to the first scan line S1i in a corresponding horizontal period. In addition, the turn-on level of scan signal may be applied to the second scan line S2i in synchronization with the first scan line S1i. In another embodiment, during the display period, the turn-on level of a scan signal is always applied to the second scan line S2i.

For example, when the turn-on level of a scan signal is applied to the first scan line S1i and the second scan line S2i, the second transistor T2 and the third transistor T3 are turned on. Therefore, a voltage corresponding to a difference between the data voltage DSij and the initialization power VINT is written or stored to the storage capacitor Cst of the pixel PXij.

In the pixel PXij, a driving current amount flowing through a driving path connecting the first power ELVDD, the first transistor T1, and the second power ELVSS is determined, according to a voltage difference between a gate electrode and a source electrode of the first transistor T1. A light emission luminance of the light emitting element LD may be determined according to the driving current amount.

Thereafter, when a turn-off level (low level) of a scan signal is applied to the first scan line S1i and the second scan line S2i, the second transistor T2 and the third transistor T3 may be turned off. Therefore, regardless of a voltage change of the data line Dj, the voltage difference between the gate electrode and the source electrode of the first transistor T1 may be maintained by the storage capacitor Cst and the light emission luminance of the light emitting element LD may be maintained.

Figure 4:
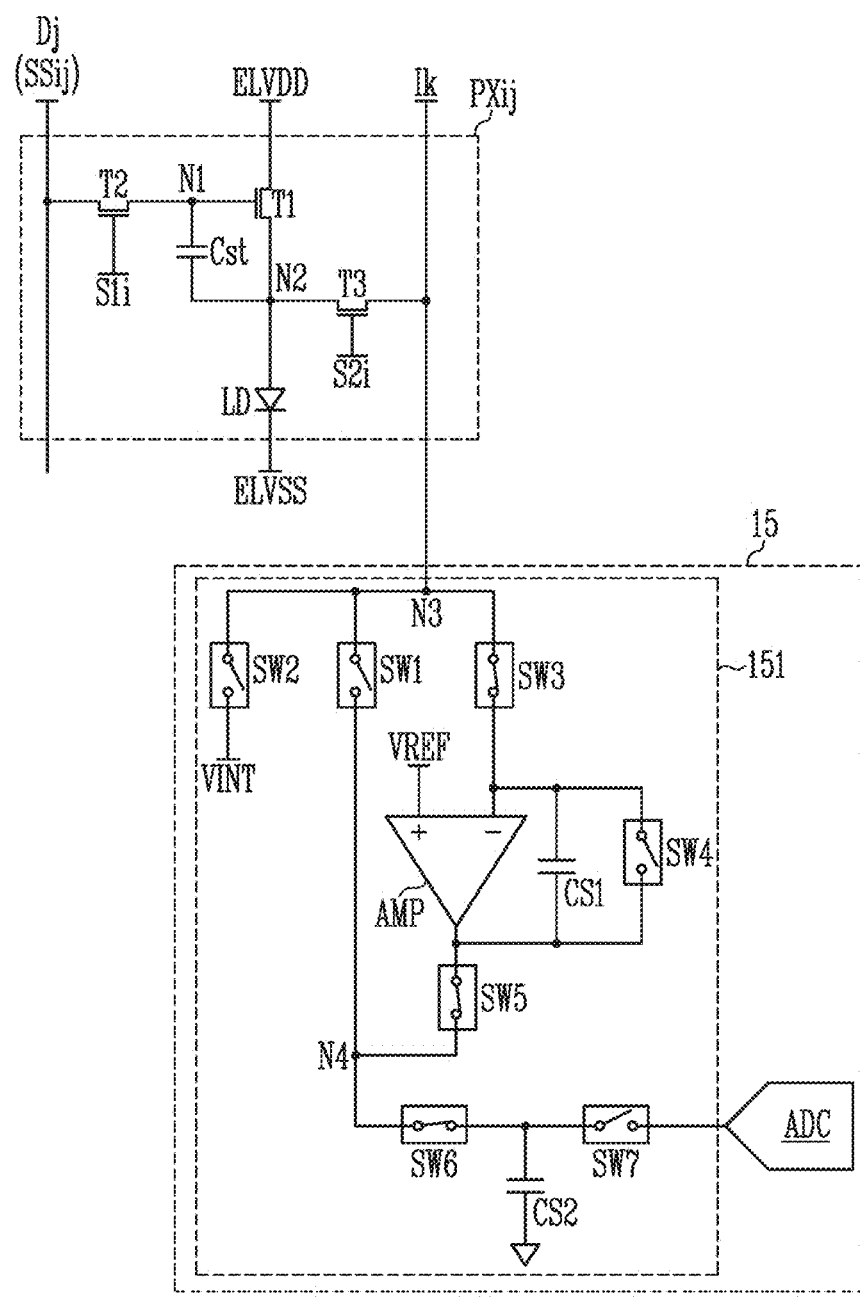
FIGS. 4 and 5 are diagrams illustrating a method of driving a pixel and a sensing channel in a mobility sensing period according to an embodiment of the disclosure.
Figure 5:
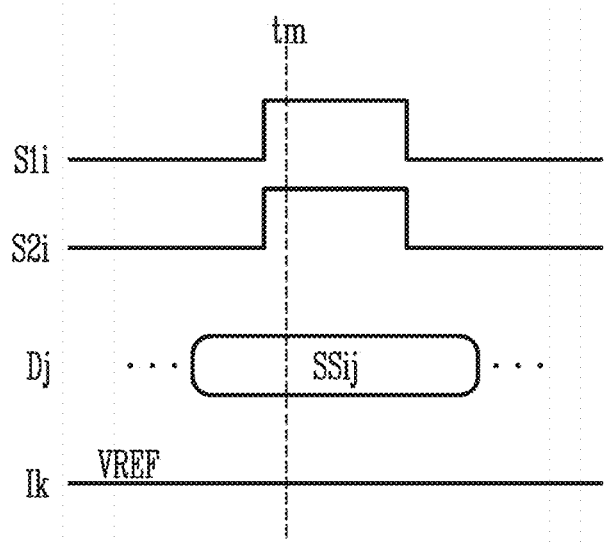

FIGS. 4 and 5 are diagrams illustrating a method of driving a pixel and a sensing channel in a mobility sensing period according to an embodiment of the disclosure.

Referring to FIG. 5, an exemplary waveform of signals applied to the scan lines S1i and S2i, the data line Dj, and the sensing line Ik connected to the pixel PXij during the mobility sensing period is shown. In FIG. 4, a state of the pixel Pxij and the sensing channel 151 is shown based on a time point tm of FIG. 5.

A sensing voltage Ssij may be applied to the data line Dj. The sensing line Ik may be connected to the reference power VREF. Referring to FIG. 4, the third switch SW3 may be in a turn-on state. Since the non-inverting terminal and the inverting terminal of the amplifier AMP are in a virtual short state, it may be recognized that the sensing line Ik is connected to the reference power VREF.

When the scan signals of the turn-on level are applied to the first scan line S1i and the second scan line S2i in synchronization with the sensing voltage SSij, the second transistor T2 and the third transistor T3 may be turned on.

Therefore, the sensing voltage SSij may be applied to the first node N1 of the pixel PXij, and a voltage of the reference power VREF may be applied to the second node N2. A voltage difference between the sensing voltage SSij and the reference power VREF may be greater than a threshold voltage of the first transistor T1. Therefore, the first transistor T1 is turned on, and a sensing current flows through a sensing current path connecting the first power ELVDD, the first transistor T1, the second node N2, the third transistor T3, the third node N3, the third switch SW3, and the first electrode of the sensing capacitor CS1. The sensing current may include characteristic information of the first transistor T1 according to Equation 1.

$$Id = \tfrac{1}{2}(u \times Co)(W/L)(Vgs - Vth)^2 \qquad [\text{Equation 1}]$$

In Equation 1, Id may be the sensing current flowing through the first transistor T1, u may be mobility, Co may be a capacitance formed by a channel, an insulating layer, and a gate electrode of the first transistor T1, W may be a width of the channel of the first transistor T1, L may be a length of the channel of the first transistor T1, Vgs may be a voltage difference between the gate electrode and the source electrode of the first transistor T1, and Vth may be a threshold voltage value of the first transistor T1.

Here, Co, W, and L are fixed constants. Vth may be sensed by another detection method. Vgs is a difference of the voltage between the sensing voltage SSij and the voltage of the reference power VREF. Since a voltage of the third node N3 is fixed, a voltage of the fourth node N4 is decreased as the sensing current Id increases. The voltage of the fourth node N4 may be stored in the sampling capacitor CS2 as the sampling signal. Thereafter, the analog-to-digital converter ADC may convert the sampling signal stored in the sampling capacitor CS2 into a digital signal (that is, a sensing value) through the turned-on seventh switch SW7. The timing controller 11 or the abnormal state sensor 16 (e.g., a second sensor) may calculate a magnitude of the sensing current Id based on the sensing value. Therefore, the mobility u, which is a remaining variable, may be obtained.

Figure 6:
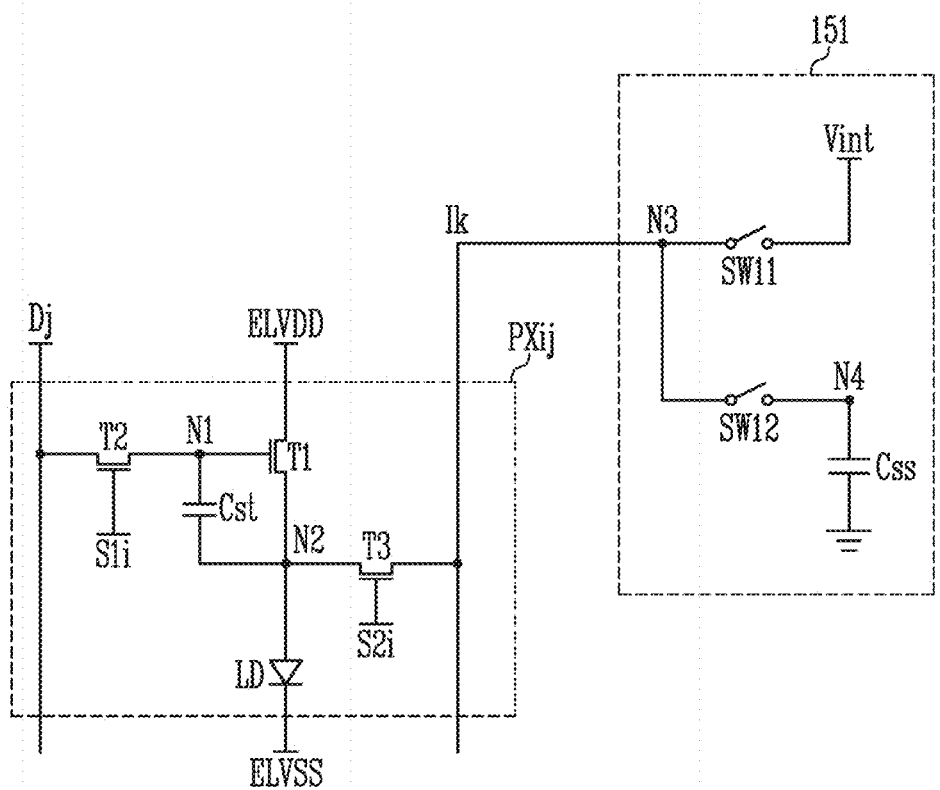
FIGS. 6 and 7 are diagrams illustrating a method of driving a pixel and a sensing channel in a display period according to an embodiment of the disclosure.
Figure 7:
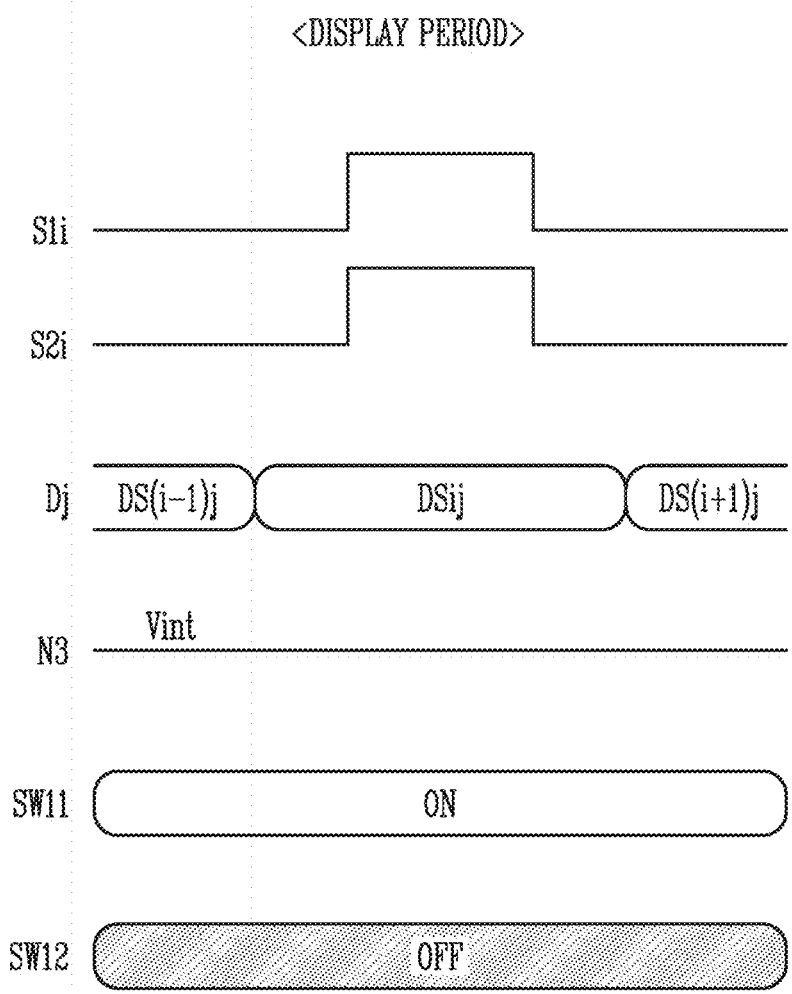

FIGS. 6 and 7 are diagrams illustrating a method of driving a pixel and a sensing channel in a display period according to another embodiment of the disclosure.

Referring to FIG. 6, since a structure of the pixel PXij is the same as that described with reference to FIGS. 2 to 4, a repetitive description is omitted.

The sensing channel 151 of FIG. 6 may include a first switch SW11, a second switch SW12, and a sensing capacitor Css.

A first electrode of the first switch SW11 may be connected to the third node N3. For example, the third node N3 may correspond to the sensing line Ik. A second electrode of the first switch SW11 may receive the initialization voltage Vint. For example, the second electrode of the first switch SW11 may be connected to the initialization voltage Vint.

A first electrode of the second switch SW12 may be connected to the third node N3, and a second electrode of the second switch SW12 may be connected to the fourth node N4.

A first electrode of the sensing capacitor Css may be connected to the fourth node N4, and a second electrode of the sensing capacitor Css may be connected to reference power (for example, ground).

The sensor 15 illustrated in FIG. 6 may include an analog-to-digital converter. For example, the sensor 15 may include analog-to-digital converters corresponding to the number of sensing channels. The analog-to-digital converter may convert a sensing voltage stored in the sensing capacitor Css into a digital value (that is, a sensing value). The converted digital value may be provided to the timing controller 11 or the abnormal state sensor 16. In another example, the sensor 15 may include analog-to-digital converters of the number less than that of the sensing channels, and may convert sensing signals stored in the sensing channels in a time-division method.

Referring to FIG. 7, during the display period, the sensing line Ik, that is, the third node N3 may receive the initialization voltage Vint. During the display period, the first switch SW11 may be turned on, and the second switch SW2 may be turned off.

During the display period, data voltages DS(i−1)j, DSij, and DS(i+1)j may be sequentially applied to the data line Dj in a horizontal period unit. A turn-on level (for example, a logic high level) of first scan signal may be applied to the first scan line S1i in a corresponding horizontal period. In addition, a turn-on level of second scan signal may also be applied to the second scan line S2i in synchronization with the first scan line S1i. In another embodiment, during the display period, the turn-on level of second scan signal may always be applied to the second scan line S2i.

For example, when the turn-on level of scan signals are applied to the first scan line S1i and the second scan line S2i, the second transistor T2 and the third transistor T3 may be turned on. Therefore, a voltage corresponding to a difference between the data voltage DSij and the initialization voltage Vint is written or stored to the storage capacitor Cst of the pixel PXij.

In the pixel PXij, according to a voltage difference between the gate electrode and the source electrode of the first transistor T1, the driving current amount flowing through the driving path connecting the first power line ELVDD, the first transistor T1, the light emitting diode LD, and the second power line ELVSS is determined. A light emission luminance of the light emitting element LD may be determined according to the driving current amount.

Thereafter, when a turn-off level (for example, a logic low level) of scan signal is applied to the first scan line S1i and the second scan line S2i, the second transistor T2 and the third transistor T3 may be turned off. Therefore, regardless of a voltage change of the data line Dj, the voltage difference between the gate electrode and the source electrode of the first transistor T1 may be maintained by the storage capacitor Cst, and the light emission luminance of the light emitting element LD may be maintained.

Figure 8:
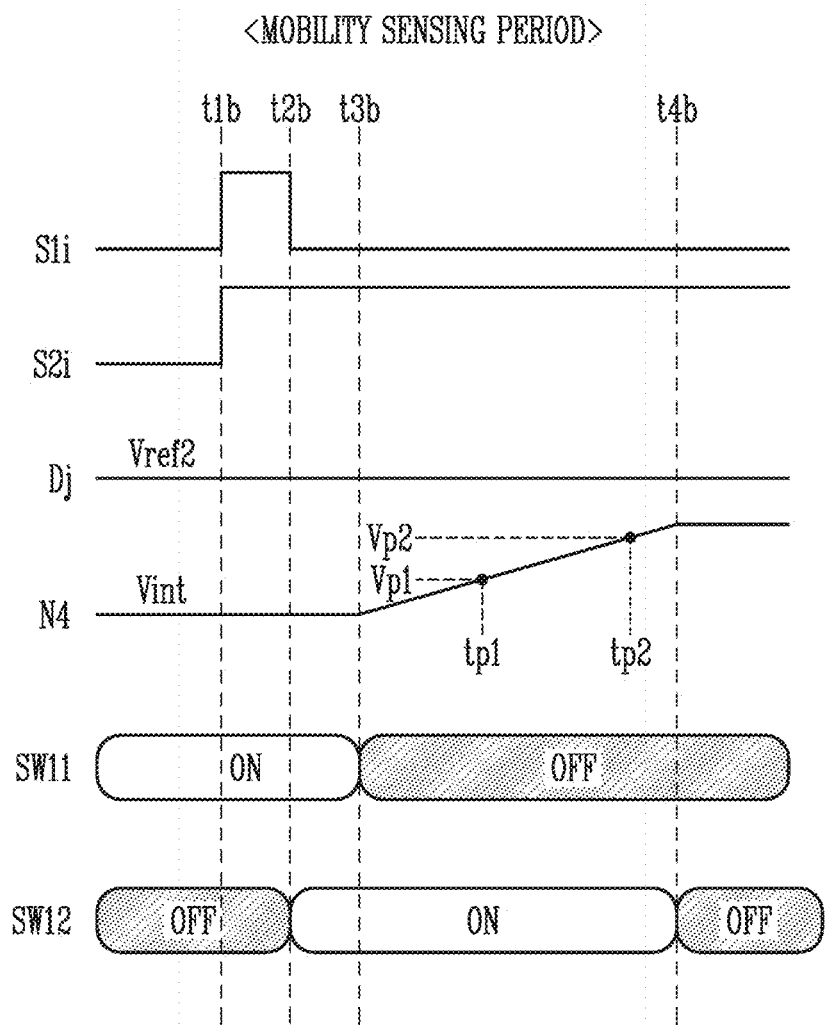
FIG. 8 is a diagram illustrating a method of driving a pixel and a sensing channel in a mobility sensing period according to an embodiment of the disclosure.

FIG. 8 is a diagram illustrating a method of driving a pixel and a sensing channel in a mobility sensing period according to an embodiment of the disclosure.

At a time point t1b, the turn-on level of first scan signal may be applied to the first scan line S1i and the turn-on level of second scan signal may be applied to the second scan line S2i. At this time, since a reference voltage Vref2 is applied to the data line Dj, the reference voltage Vref2 may be applied to the first node N1. In addition, since the first switch SW11 is in a turn-on state, the initialization voltage Vint may be applied to the second node N2 and the third node N3. Accordingly, the first transistor T1 may be turned on according to the difference between a gate voltage and a source voltage.

At a time point t2b, as the turn-off level of first scan signal is applied to the first scan line S1i, the first node N1 may be in a floating state. In addition, the initialization voltage Vint may be applied to the fourth node N4 as the second switch SW12 is turned on.

At a time point t3b, the first switch SW11 may be turned off. Accordingly, as a current is supplied from the first power line ELVDD through the first transistor T1, a voltage of the second, third, and fourth nodes N2, N3, and N4 increases. At this time, since the first node N1 is in the floating state, a gate-source voltage difference of the first transistor T1 may be maintained.

At a time point t4b, the second switch SW12 may be turned off. Accordingly, the sensing voltage is stored in the first electrode of the sensing capacitor Css. A sensing current of the first transistor T1 may be obtained as in Equation 2 below.

$$I = C^{*}(Vp2-Vp1)/(tp2-tp1) \qquad \text{[Equation 2]}$$

In Equation 2, I is the sensing current of the first transistor T1, C is a capacitance of the sensing capacitor Css, Vp2 is the sensing voltage at the time point tp1, and Vp1 is the sensing voltage at the time point tp2.

Assuming that a voltage slope of the fourth node N4 between the time point t3b and the time point t4b is linear, since the sensing voltage at the time point t3b and the sensing voltage at the time point t4b may be known, the sensing current of the first transistor T1 may be calculated. In addition, a mobility of the first transistor T1 may be calculated using the calculated sensing current. For example, as the sensing current increases, the mobility may increase. For example, a magnitude of the mobility may be proportional to a magnitude of the sensing current.

Figure 9:
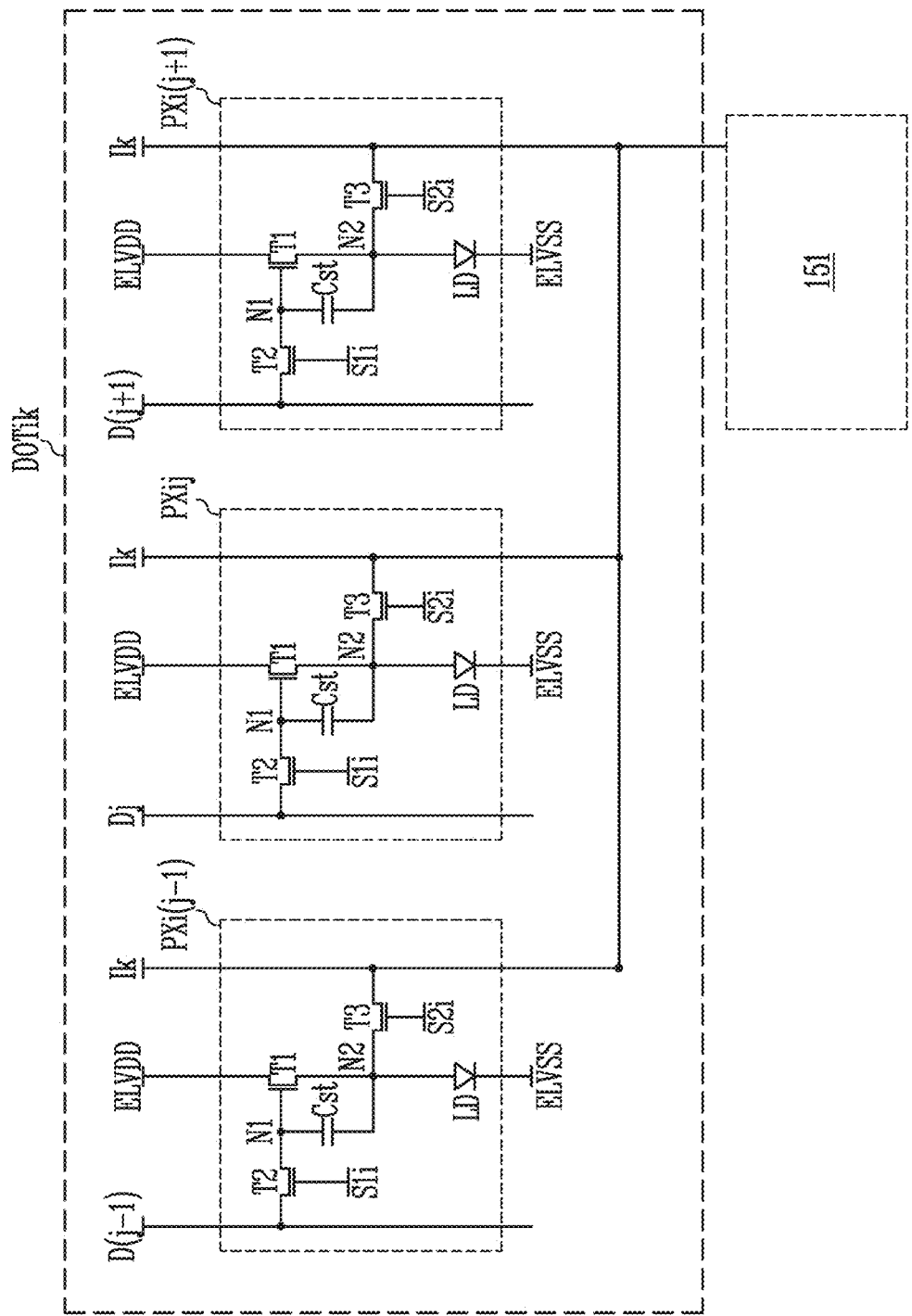
FIG. 9 is a diagram illustrating a connection relationship between a sensing channel and pixels according to an embodiment of the disclosure.

FIG. 9 is a diagram illustrating a connection relationship between a sensing channel and pixels according to an embodiment of the disclosure.

Referring to FIG. 9, a dot DOTik according to an embodiment of the disclosure may include a plurality of pixels PXi(j−1), PXij, and PXi(j+1). The plurality of pixels PXi(j−1), PXij, and PXi(j+1) included in the same dot DOTik may be connected to the sensing channel 151 through the same sensing line Ik.

For example, the plurality of pixels PXi(j−1), PXij, and PXi(j+1) may be pixels of different colors. For example, the pixel PXi(j−1) may be a pixel of a first color, the pixel PXij may be a pixel of a second color, and the pixel PXi(j+1) may be a pixel of a third color. That is, the pixel PXi(j−1) may include a light emitting element LD capable of emitting light in the first color, the pixel PXij may include a light emitting element LD capable of emitting light in the second color, the pixel PXi(j+1) may include a light emitting element LD capable of emitting light in the third color.

The first color, the second color, and the third color may be different colors. For example, the first color may be one color among red, green, and blue, the second color may be one color other than the first color among red, green, and blue, and the third color may be a remaining color other than the first color and the second color among red, green, and blue. In addition, magenta, cyan, and yellow may be used instead of red, green, and blue as the first to third colors.

According to an embodiment, when sensing characteristic information of the pixels of the pixel unit 14, the sensor 15 may sense pixels of the same color. For example, the sensor 15 may sense characteristic information on pixels of the first color of the pixel unit 14 during a first color sensing period. Similarly, the sensor 15 may sense characteristic information on pixels of the second color during a second color sensing period different from the first color sensing period. In addition, the sensor 15 may sense characteristic information on pixels of the third color during a third color sensing period different from the first color sensing period and the second color sensing period.

For example, while the pixel PXi(j−1) of the first color is sensed, a turn-off level (corresponding to a black grayscale) of data voltages may be applied to data lines Dj and D(j+1) of the pixels PXij and PXi(j+1) of different colors (i.e., colors different from the first color). Therefore, while the pixel PXi(j−1) of the first color is sensed, the first transistors T1 of the pixels PXij and PXi(j+1) may be turned off, and thus the characteristic information of the pixel PXi(j−1) may not be affected.

In FIG. 9, three pixels are connected to the same scan lines S1i and S2i under an assumption that each dot has an RGB stripe structure. In another embodiment, when each dot is configured in a PENTILE™ structure, each dot may include only two pixels. In still another embodiment, each dot may include pixels of different colors connected to different scan lines and sharing the same sensing line.

Figure 10:
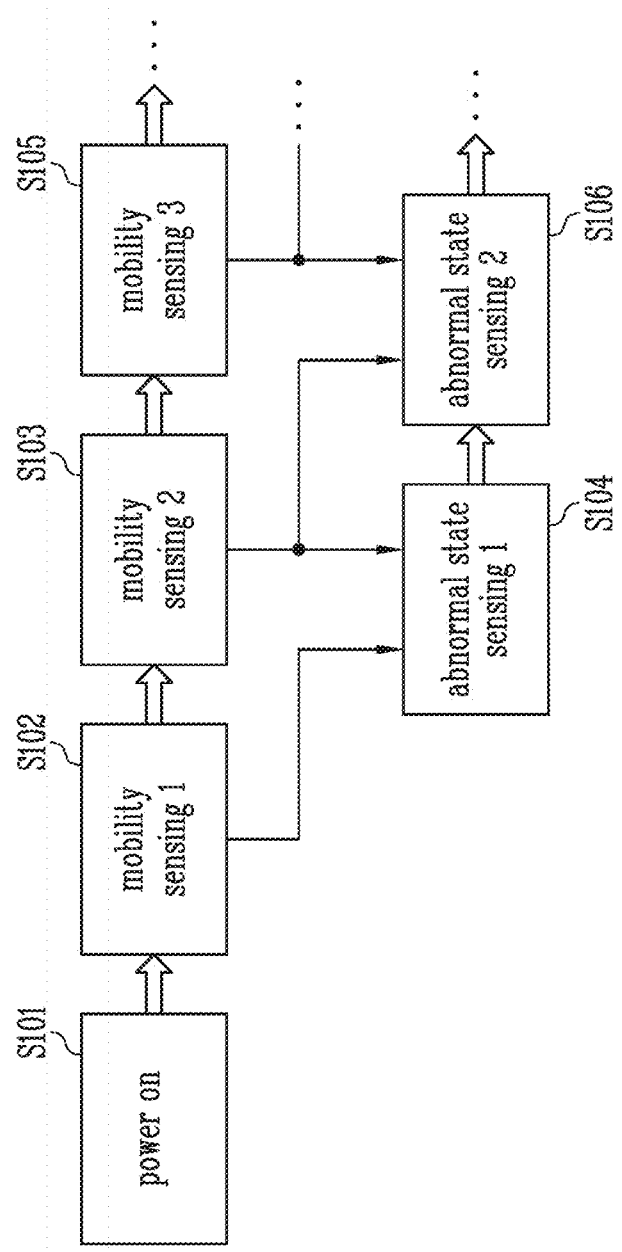
FIG. 10 is a diagram illustrating a method of sensing an abnormal state according to an embodiment of the disclosure.

FIG. 10 is a diagram illustrating a method of sensing an abnormal state according to an embodiment of the disclosure.

In an embodiment of FIG. 10, in a power-on step (S101) of the display device 10, the sensor 15 does not perform a mobility sensing process. In the power-on step (S101), the pixel unit 14 does not display an image.

The sensor 15 may generate a first sensing value for all or some pixels of the pixel unit 14 in a first mobility sensing process (S102) after the power-on step (S101). For example, the first mobility sensing process may sense a mobility of one or more pixels of the pixel unit 14 during a first period after an image is displayed, after the power-on. The first mobility sensing process (S102) may include a plurality of frame periods. For example, the first mobility sensing process may be performed during the frame periods. During the first mobility sensing process (S102), the pixel unit 14 may display an image corresponding to the plurality of frame periods.

The sensor 15 may generate a second sensing value for all or some pixels of the pixel unit 14 in a second mobility sensing process (S103) that is performed after the first mobility sensing process (S102). For example, the first mobility sensing process may sense a mobility of one or more pixels of the pixel unit 14 during a second period after the first period while an image is still being displayed. The second mobility sensing process (S103) may include a plurality of frame periods. During the second mobility sensing process (S103), the pixel unit 14 may display an image corresponding to the plurality of frame periods.

The abnormal state sensor 16 may calculate a difference (e.g., a difference value) between the first sensing value and the second sensing value for the same pixel while performing the second mobility sensing process (S103) (S104). When the difference between the first sensing value and the second sensing value for the same pixel exceeds a predetermined threshold value, the abnormal state sensor 16 may sense that the pixel unit 14 is in the abnormal state. However, a more detailed method of sensing an abnormal state is described later with reference to FIGS. 14 to 16. When the abnormal state is sensed, the abnormal state sensor 16 may shut down the display device 10 or reduce brightness of the display device 10.

Meanwhile, when the pixel unit 14 is sensed as having the normal state, the sensor 15 may generate a third sensing value from all or some pixels of the pixel unit 14 in a third mobility sensing process (S105) after performing the second mobility sensing process (S103). The third mobility sensing process (S105) may include a plurality of frame periods. During the third mobility sensing process (S105), the pixel unit 14 may display an image corresponding to the plurality of frame periods.

The abnormal state sensor 16 may calculate a difference between the second sensing value and a third sensing value for the same pixel while performing the third mobility sensing process (S105) (S106). When the difference between the second sensing value and the third sensing value for the same pixel exceeds a predetermined threshold value, the abnormal state sensor 16 may sense that the pixel unit 14 is in the abnormal state. However, a more detailed method of sensing an abnormal state is described later with reference to FIGS. 14 to 16. When the abnormal state is sensed, the abnormal state sensor 16 may shut down the display device 10 or reduce a brightness of the display device 10.

Figure 11:
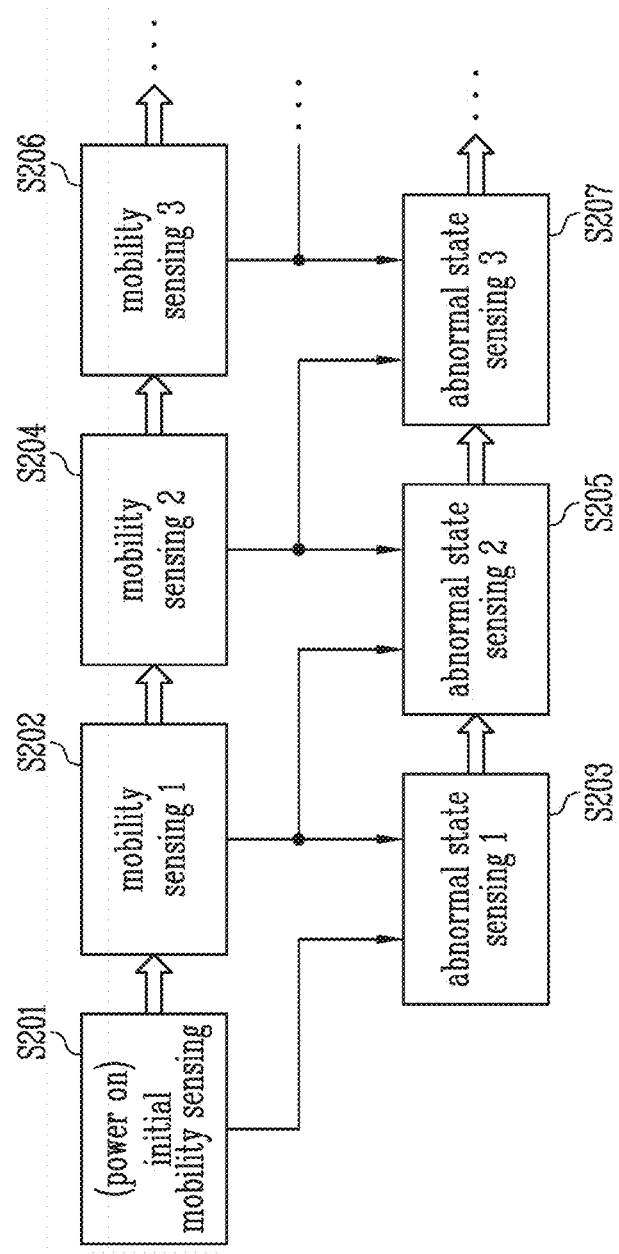
FIG. 11 is a diagram illustrating a method of sensing an abnormal state according to an embodiment of the disclosure.

FIG. 11 is a diagram illustrating a method of sensing an abnormal state according to an embodiment of the disclosure.

In the embodiment of FIG. 11, when the display device 10 is powered on, the sensor 15 performs an initial mobility sensing process (S201). Therefore, the sensor 15 may generate an initial sensing value for all or some pixels of the pixel unit 14. In the initial mobility sensing process (S201), the pixel unit 14 does not display an image. For example, the first mobility sensing process may sense a mobility of one or more pixels of the pixel unit 14 during a first period after the power-on, but before an image is displayed.

The sensor 15 may generate a first sensing value for all or some pixels of the pixel unit 14 in a first mobility sensing process (S202) after the initial mobility sensing process (S201). The first mobility sensing process (S202) may include a plurality of frame periods. During the first mobility sensing process (S202), the pixel unit 14 may display an image corresponding to the plurality of frame periods. For example, the first mobility sensing process may sense a mobility of one or more pixels of the pixel unit 14 during a second period after the first period while an image is displayed.

The abnormal state sensor 16 may calculate a difference between the initial sensing value and the first sensing value for the same pixel while performing the first mobility sensing process (S202) (S203). When the difference between the initial sensing value and the first sensing value for the same pixel exceeds a predetermined threshold value, the abnormal state sensor 16 may sense that the pixel unit 14 is in the abnormal state. However, a more detailed method of sensing an abnormal state is described later with reference to FIGS. 14 to 16. When the abnormal state is sensed, the abnormal state sensor 16 may shut down the display device 10 or reduce a brightness of the display device 10.

In the embodiment of FIG. 11, while performing the first mobility sensing process (S202), the abnormal state sensor 16 may first sense whether the pixel unit 14 is in the abnormal state. In the above-described embodiment of FIG. 10, while performing the second mobility sensing process (S103), the abnormal state sensor 16 may first sense whether the pixel unit 14 is in the abnormal state. That is, compared to the embodiment of FIG. 10, the embodiment of FIG. 11 may sense whether or not the pixel unit 14 is in the abnormal state more quickly.

According to the present embodiment, the sensor 15 may generate the initial sensing value in the initial mobility sensing process (S201) from a power-on time point of the display device 10 to a display start time point, and may generate the first sensing value in the first mobility sensing process (S202) after the display start time point. For example, the initial mobility sensing process may sense a mobility during a first period from the power-on time point to a point just before the display device 10 begins displaying an image and determine the initial sensing value from sensed mobility. At this time, the abnormal state sensor 16 may sense whether the pixel unit 14 is in the abnormal state based on the initial sensing value and the first sensing value.

Since other subsequent processes (S204, S205, S206, and S207) are repetitions of the above-described processes, a repetitive description is omitted.

Figure 12:
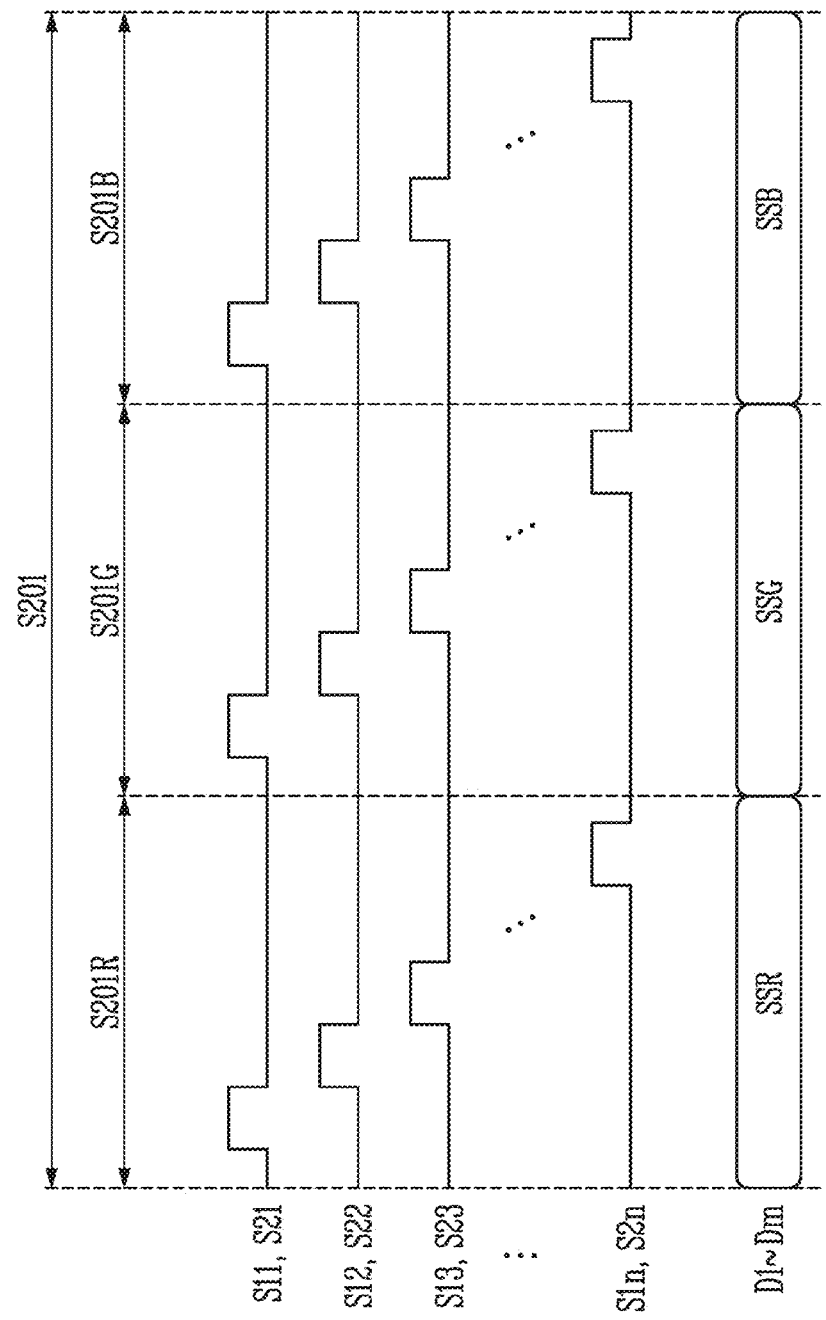
FIG. 12 is a diagram illustrating an initial mobility sensing process according to an embodiment of the disclosure.

FIG. 12 is a diagram illustrating an initial mobility sensing process according to an embodiment of the disclosure.

The scan driver 13 may sequentially supply the scan signals to the scan lines in the initial mobility sensing process (S201). For example, the scan driver 13 may sequentially supply the turn-on level of first scan signals to the first scan lines S11, S12, S13, . . . , and S1n. In addition, the scan driver 13 may sequentially supply the turn-on level of second scan signals to the second scan lines S21, S22, S23, . . . , and S2n. In the present embodiment, the mobility sensing method of FIGS. 4 and 5 is described as an example, but another mobility sensing method such as that of FIG. 8 may be used.

In an embodiment, the data driver 12 successively supplies sensing voltages SSR, SSG, and SSB for mobility sensing to the data lines D1 to Dm in the initial mobility sensing process (S201), and does not supply data voltages for image display to the data lines D1 to Dm in the initial mobility sensing process.

According to an embodiment, the initial mobility sensing process (S201) may be performed in a time-division method on pixels having the same color of the pixel unit 14. For example, the initial mobility sensing process (S201) may sequentially include a first color sensing period S201R, a second color sensing period S201G, and a third color sensing period S201B.

In each of the first color sensing period S201R, the second color sensing period S201G, and the third color sensing period S201B, the scan driver 13 may identically operate. According to an embodiment, the data driver 12 may supply different sensing voltages SSR, SSG, and SSB during corresponding sensing periods S201R, S201G, and S201B according to a characteristic of the light emitting elements LD of different colors.

Figure 13:
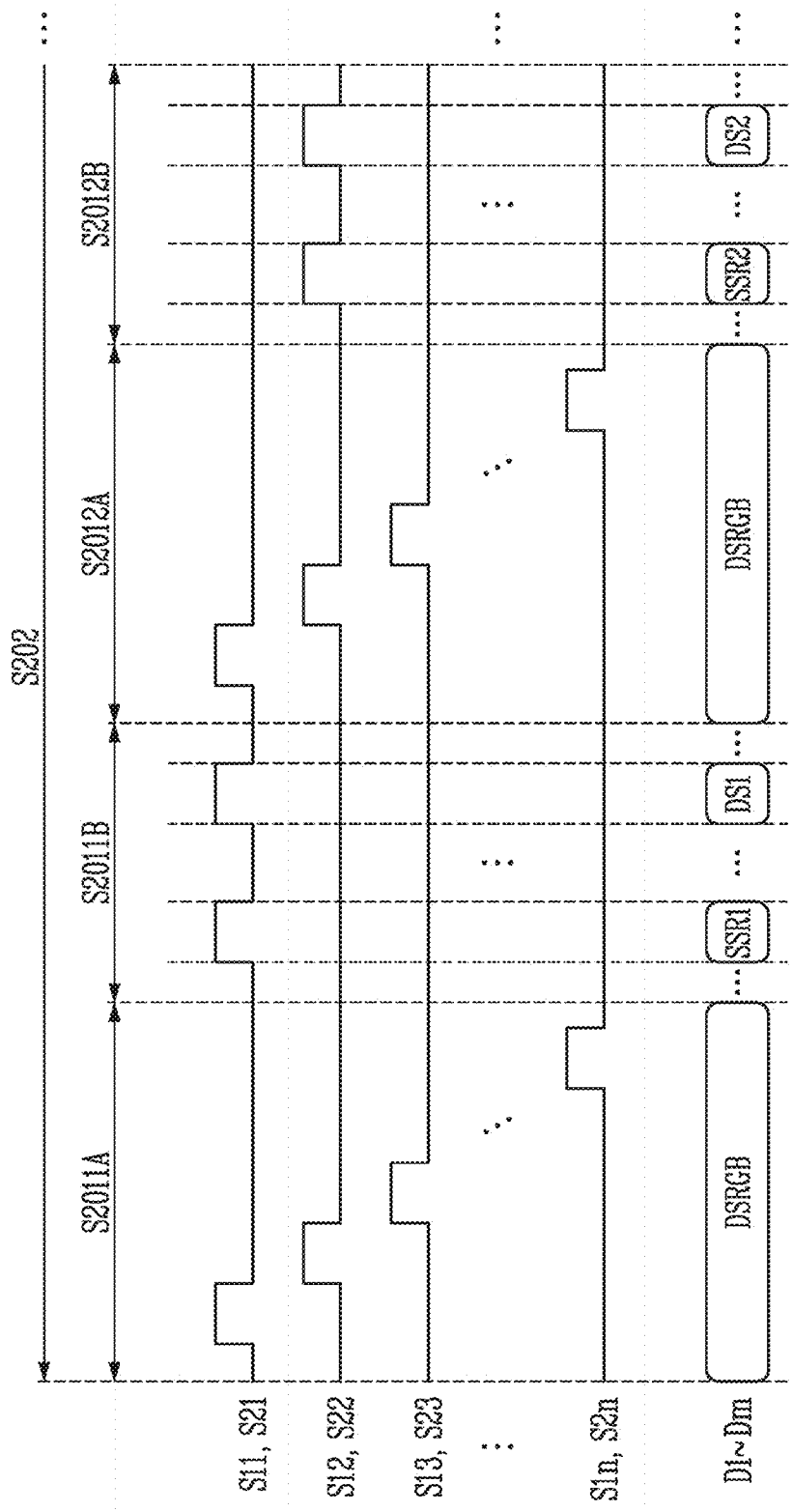
FIG. 13 is a diagram illustrating a first mobility sensing process according to an embodiment of the disclosure.

FIG. 13 is a diagram illustrating a first mobility sensing process according to an embodiment of the disclosure. Since a subsequent second mobility sensing process (S204), third mobility sensing process (S206), and the like may be performed identically to the first mobility sensing process (S202), a repetitive description is omitted.

The sensor 15 may perform the first mobility sensing process (S202) during blank periods S2011B, S2012B, . . . positioned between active periods S2011A, S2012A, . . . . Each frame period may include one active period. That is, the first mobility sensing process (S202) may be performed during a plurality of frame periods.

The active period may be a supply period during which grayscale values representing an image frame to be displayed by the pixel unit 14 are supplied. The blank period may be a period between adjacent active periods, and clock training, frame setting, dummy data supply, mobility sensing, and the like may be performed in the blank period. In an embodiment, the grayscale values are not supplied or data voltages representing the grayscale values are not supplied during the blank period. The blank period may be shorter than the active period, and the sensor 15 may be configured to perform mobility sensing on only some pixel rows instead of all pixels of the pixel unit 14.

In the first mobility sensing process (S202), the scan driver 13 may supply the scan signals to different scan lines during different blank periods S2011B and S2012B. For example, in the first blank period S2011B, mobility sensing may be performed on pixels of a first color of a first pixel row connected to the scan lines S11 and S21. In addition, in the second blank period S2011B, mobility sensing may be performed on pixels of the first color of a second pixel row connected to the scan lines S12 and S22. Similarly, in an n-th blank period, mobility sensing may be performed on pixels of the first color of an n-th pixel row connected to the scan lines S1n and S2n. In a subsequent (n+1)-th blank period, mobility sensing may be performed on the pixels of the second color of the first pixel row connected to the scan lines S11 and S21.

As described above, in the first mobility sensing process (S202), when sensing for the pixels of the first color has ended, sensing for the pixels of the second color may be performed, and when the sensing for the pixels of the second color has ended, sensing for the pixels of the third color may be performed. Therefore, sensing for all pixels of the pixel unit 14 is possible over a plurality of frame periods. Therefore, a time required for the first mobility sensing process (S202) may be longer than a time required for the initial mobility sensing process (S201). For example, a processing time of the first mobility sensing process may be longer than a processing time of the initial mobility sensing process.

The data driver 12 may first supply sensing voltages SSR1 and SSR2 to the data lines D1 to Dm and then supply data voltages DS1 and DS2 to the data lines D1 to Dm during each of the blank periods S2011B and S2012B in the first mobility sensing process S202. In an embodiment, the data voltages DS1 and DS2 supplied during the blank periods S2011B and S2012B may be the same as some (data voltages of a corresponding pixel row) of data voltages DSRGB supplied during immediately previous active periods S2011A and S2012A.

For example, during the active period S2011A, the scan driver 13 may sequentially supply the turn-on level of scan signals to the scan lines S11 to S2n. The data driver 12 may supply the data voltages DSRGB for image display to the data lines D1 to Dm in synchronization with the scan signals. Accordingly, the data voltages DSRGB may be written to the pixel unit 14, and an image corresponding to the written data voltages DSRGB may be displayed by the pixel unit 14.

Next, during the blank period S2011B, the scan driver 13 may supply the turn-on level of scan signals to the scan lines S11 and S21. At this time, the data driver 12 may supply the sensing voltages SSR1 to the data lines D1 to Dm, and thus the sensor 15 may perform mobility sensing on the pixels of the first color of the pixel row connected to the scan lines S11 and S21. Meanwhile, after sensing has ended, the scan driver 13 may supply the turn-on level of scan signals to the scan lines S11 and S21 again. At this time, the data driver 12 may supply the data voltages DS1 to the data lines D1 to Dm, and thus the pixels of the first color of the pixel row may display the same image as that in the active period S2011A.

Figure 14:
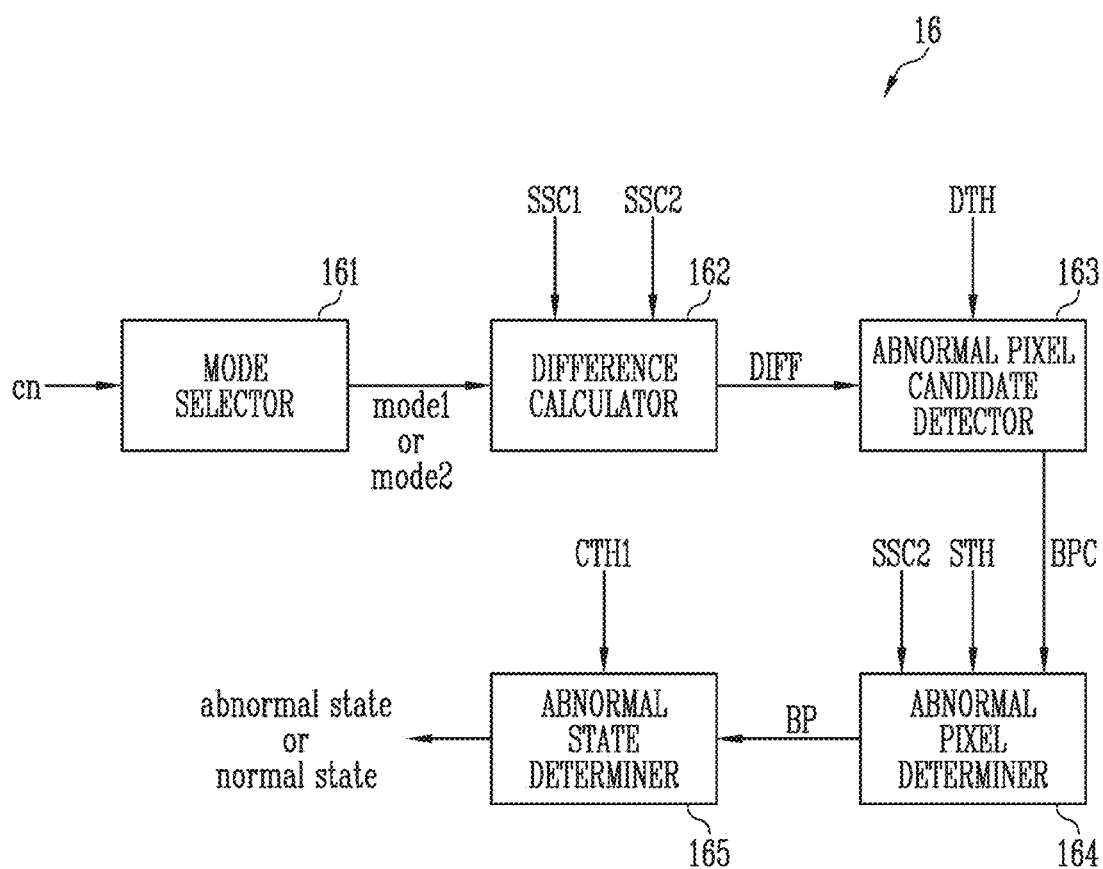
FIG. 14 is a diagram illustrating an abnormal state sensor according to an embodiment of the disclosure.

FIG. 14 is a diagram illustrating an abnormal state sensor according to an embodiment of the disclosure.

The abnormal state sensor 16 according to an embodiment of the disclosure may include a mode selector 161 (e.g., a selection circuit), a difference calculator 162 (e.g., a subtractor), an abnormal pixel candidate detector 163 (e.g., a first logic circuit), an abnormal pixel determiner 164 (e.g., a second logic circuit), and an abnormal state determiner 165 (e.g., a third logic circuit).

The mode selector 161 may select a first mode mode1 or a second mode mode2 according to the number of times cn that the mobility sensing process is performed. For example, in counting the number of times cn the mobility sensing process is performed, the initial mobility sensing process (S201) may not be counted. For example, the number of times cn may be the number obtained by counting the mobility sensing processes (S202, S204, S206, . . . ) during the image display period.

The mode selector 161 may select the first mode mode1 when only the initial mobility sensing process (S201) and the first mobility sensing process (S202) are performed, and select the second mode mode2 when the mobility sensing processes (S204, S206, . . . ) is performed after the first mobility sensing process (S202). For example, when the number of the times cn is 1, since only the initial mobility sensing process (S201) and the first mobility sensing process (S202) are performed, the mode selector 161 may select the first mode mode1. When the number of times cn is an integer greater than 1, since the mobility sensing processes (S204, S206, . . . ) after the first mobility sensing process (S202) are performed, the mode selector 161 may select the second mode mode2.

The difference calculator 162 may calculate a difference value DIFF between the initial sensing value and the first sensing value during the first mode mode1, and calculate a difference value DIFF of sensing values generated in two recent mobility sensing processes during the second mode mode2.

For example, the difference calculator 162 may calculate a difference value DIFF between a current sensing value SSC2 and an immediately previous sensing value SSC1. In a case of the first mode mode1, the current sensing value SSC2 is the first sensing value generated in the first mobility sensing process (S202), and the immediately previous sensing value SSC1 is the initial sensing value generated in the initial mobility sensing process (S201). For example, in a case of the second mode mode2, the current sensing value SSC2 may be the second sensing value generated in the second mobility sensing process (S204), and the immediately previous sensing value SSC1 may be the first sensing value generated in the first mobility sensing process (S202). At a next time point, in the case of the second mode mode2, the current sensing value SSC2 may be the third sensing value generated in the third mobility sensing process (S206), and the immediately previous sensing value SSC1 may be the second sensing value generated in the second mobility sensing process (S204). In an embodiment, the difference value DIFF is calculated in units of a pixel. For example, the difference value DIFF for a pixel may be calculated from a previous sensing value SSC1 of the pixel and the current sensing value SSC2 of the same pixel.

When the difference value DIFF is greater than a first threshold value DTH, the abnormal pixel candidate detector 163 may designate corresponding pixels as abnormal pixel candidates BPC. Even though the difference value DIFF is greater than the first threshold value DTH, since it may simply be a result of an image with a large grayscale change, the abnormal pixel candidates BPC are not immediately determined as abnormal pixels. According to an embodiment, the first threshold value DTH in the first mode mode1 and the first threshold value DTH in the second mode mode2 may be set differently.

The abnormal pixel determiner 164 may determine the abnormal pixel candidates BPC as abnormal pixels BP when sensing values corresponding to the abnormal pixel candidates BPC are greater than a second threshold value STH. A case where the sensing value is greater than the second threshold value STH may mean that an overcurrent flows in a corresponding pixel. According to an embodiment, the second threshold value STH in the first mode mode1 and the second threshold value STH in the second mode mode2 may be set differently.

The abnormal state determiner 164 may determine that the pixel unit 14 is in the abnormal state when the number of abnormal pixels BP is greater than a first count threshold value CTH1, and determine that the pixel unit 14 is in the normal state when the number of abnormal pixels BP is less than the first count threshold CTH1. That is, even though some pixels are shorted and thus an overcurrent flows locally, the pixel unit 14 may operate normally. However, when the number of shorted abnormal pixels BP is greater than the first count threshold value CTH1, a risk of fire or damage to the display device 10 exists due to the overcurrent, and thus the display device 10 may be be shut down. According to an embodiment, the first count threshold value CTH1 in the first mode mode1 and the first count threshold value CTH1 in the second mode mode2 may be set differently.

Figure 15:
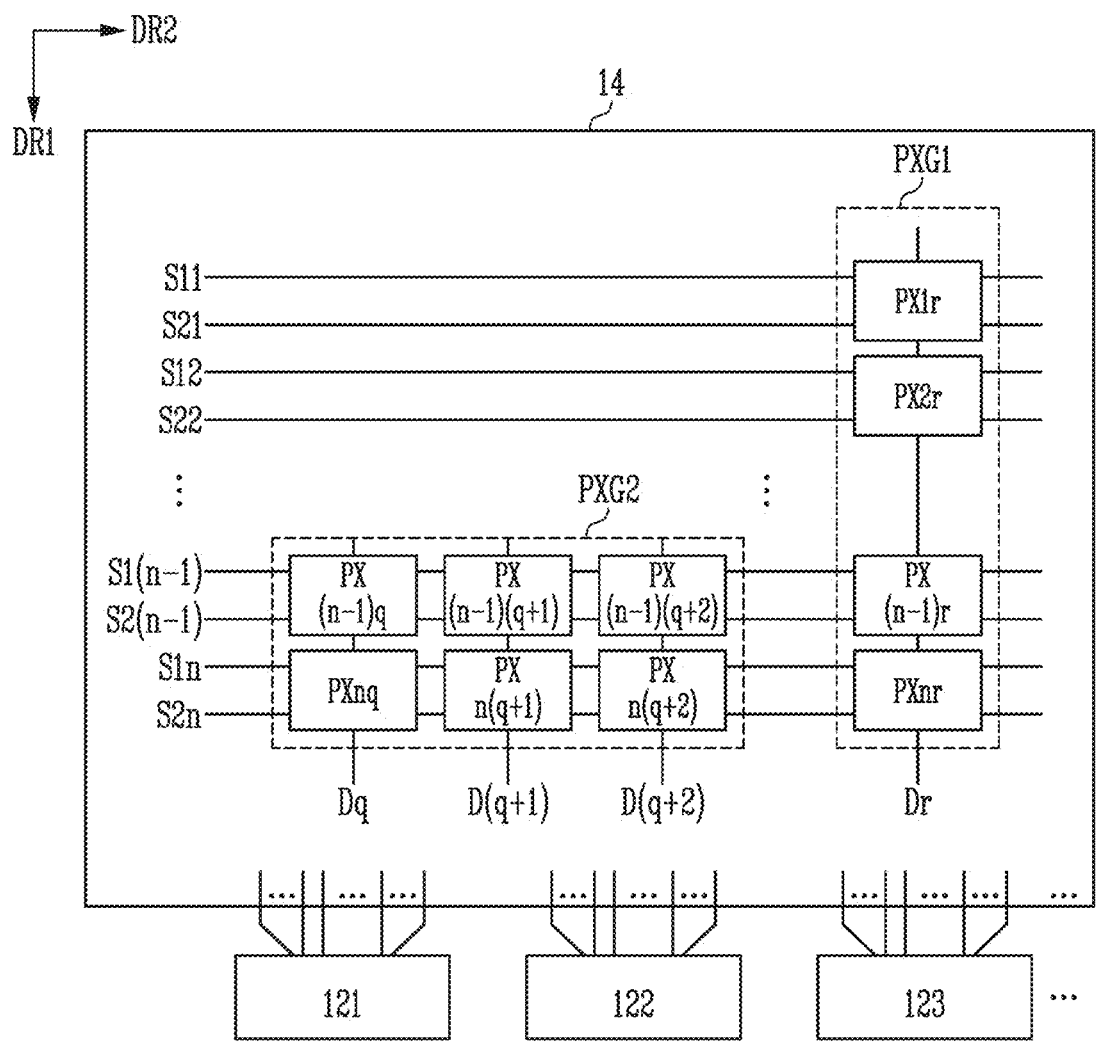
FIGS. 15 and 16 are diagrams illustrating an abnormal state sensor according to an embodiment of the disclosure.
Figure 16:
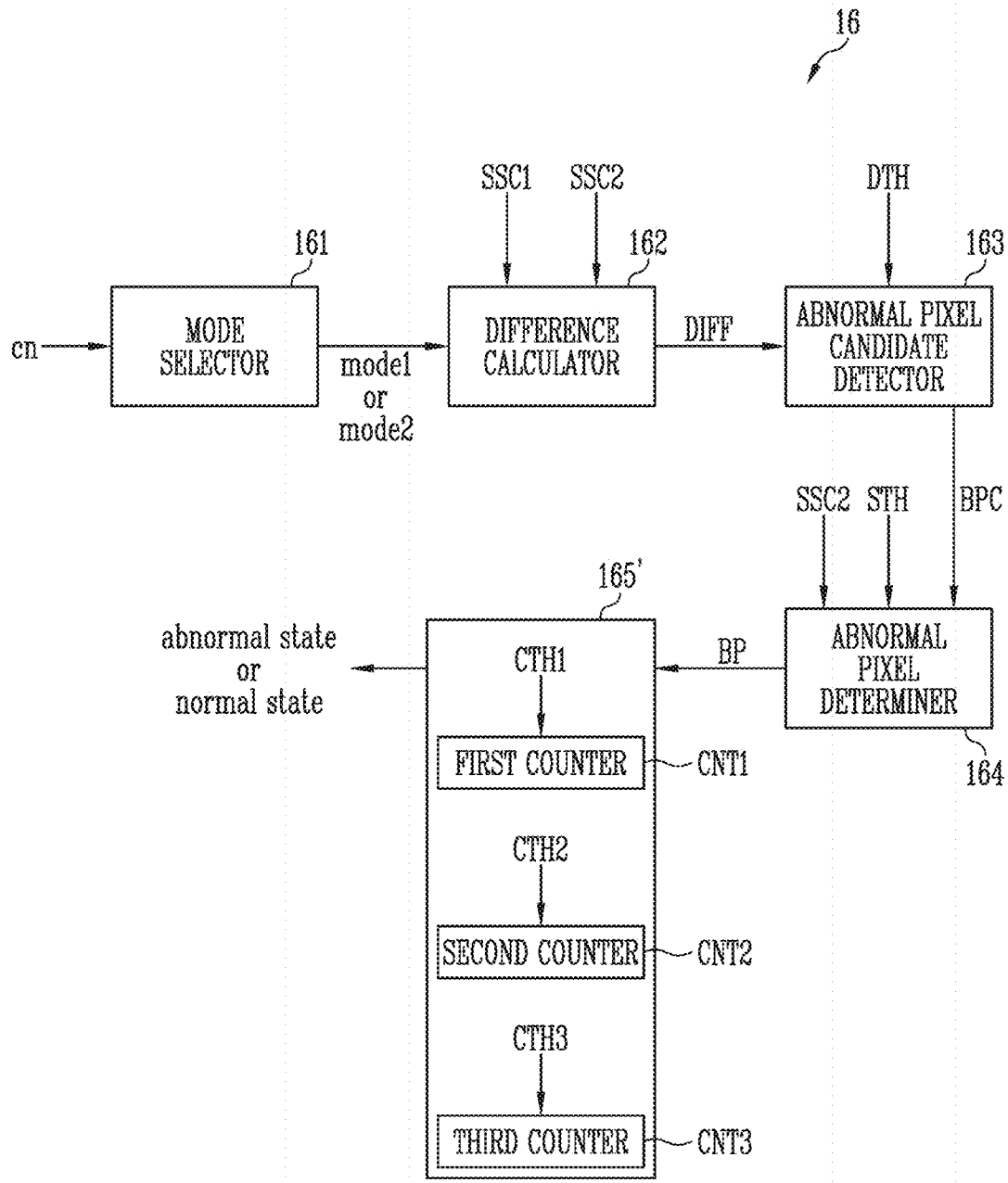

FIGS. 15 and 16 are diagrams illustrating an abnormal state sensor according to an embodiment of the disclosure.

Referring to FIG. 15, the pixel unit 14 may include the scan lines S11 to S2n arranged to be spaced apart from each other in a first direction DR1 and extending in a second direction DR2. The first direction DR1 and the second direction DR2 may be perpendicular to each other. In addition, the display device 10 may include a plurality of ICs 121, 122, 123, . . . disposed in the first direction DR1 of the pixel unit 14. Each of the plurality of ICs 121, 122, 123, . . . may integrally implement a function of the data driver 12 and the sensor 15 of FIG. 1. Data lines and sensing lines extending from each of the plurality of ICs 121, 122, 123, . . . may extend in a direction opposite to the first direction DR1 in the pixel unit 14. The pixel unit 14 may include pixels PX1r to PXnr connected to data lines Dq to Dr, the sensing lines, and the scan lines S11 to S2n.

A first pixel group PXG1 may include pixels PX1r, PX2r, . . . , and PX(n−1)r, PXnr connected to the same data line Dr and connected to different scan lines S11 to S2n. The first pixel group PXG1 may not include other pixels which are not connected to a specific data line Dr.

A second pixel group PXG2 may include pixels PX(n−1)q, PX(n−1)(q+1), PX(n−1)(q+2), PXnq, PXn(q+1), and PXn(q+2) included in a partial area adjacent in the first direction DR1 of the pixel unit 14. For example, the second pixel group PXG2 may include the pixels PXnq, PXn(q+1), and PXn(q+2) positioned at the outermost portion of the pixel unit 14 in the first direction DR1.

Referring to FIG. 16, an abnormal state determiner 165' may include a first counter CNT1 (e.g., a first counter circuit), a second counter CNT2 (e.g., a second counter circuit), and a third counter CNT3 (e.g., a third counter circuit). Since other functional units included in the abnormal state sensor 16 of FIG. 16 are the same as those of FIG. 14, a repetitive description is omitted.

The first counter CNT1 may generate a first abnormal condition value when the number of abnormal pixels BP is greater than the first count threshold value CTH1.

The second counter CNT2 may generate a second abnormal condition value when the number of abnormal pixels BP belonging to the first pixel group PXG1 connected to the different scan lines S11 to S2n and one data line Dr is greater than a second count threshold value CTH2.

The third counter CNT3 may generate a third abnormal condition value when the number of abnormal pixels BP positioned in a partial area of the pixel unit 14 and belonging to the second pixel group PXG2 connected to the plurality of scan lines S1(n−1) to S2n and the plurality of data lines Dq to D(q+2) is greater than a third count threshold value CTH3.

The abnormal state determiner 165' may determine that the pixel unit 14 is in the abnormal state when at least one of the first abnormal condition value, the second abnormal condition value, and the third abnormal condition value is generated. For example, the abnormal state determiner 165' may determine that the pixel unit 14 is in the normal state when all of the first abnormal condition value, the second abnormal condition value, and the third abnormal condition value are not generated.

Meanwhile, according to an embodiment, the abnormal state determiner 165' may include at least one of the first counter CNT1, the second counter CNT2, and the third counter CNT3. For example, each of the second count threshold value CTH2 and the third count threshold value CTH3 may be less than the first count threshold value CTH1. This is because the second counter CNT2 and the third counter CNT3 count the abnormal pixels BP for some pixels instead of all pixels.

Since current paths of the pixel unit 14 may cause a bottleneck phenomenon as the current paths are closer to the ICs 121, 122, 123, . . . , a probability that the abnormal pixels BP are generated in pixels positioned in an area of the first direction DR1 among the pixels of the pixel unit 14 is high. The third counter CNT3 may generate an abnormal state condition value faster than the first counter CNT1 by counting the abnormal pixels BP only for the pixels belonging to the second pixel group PXG2. Therefore, when the abnormal state determiner 165' is configured to include the third counter CNT3, the abnormal state determiner 165' may determine whether or not the pixel unit 14 is in the abnormal state more quickly than the abnormal state determiner 165 of FIG. 14.

Meanwhile, as described above, the probability that the abnormal pixels are generated may gradually increase along the first direction DR1 of the pixel unit 14. Therefore, even though the abnormal pixels BP are counted only for the first pixel group PXG1 including pixels connected to one data line Dr extending in the first direction DR1, a ratio of the counted abnormal pixels BP may be substantially the same as a ratio of the abnormal pixels BP to all pixels. The second counter CNT2 may generate the abnormal state condition value faster than the first counter CNT1 by counting the abnormal pixels BP only for the pixels belonging to the first pixel group PXG1. Therefore, when the abnormal state determiner 165' is configured to include the second counter CNT2, the abnormal state determiner 165' may determine whether or not the pixel unit 14 is in the abnormal state faster than the abnormal state determiner 165 of FIG. 14.

Figure 17:
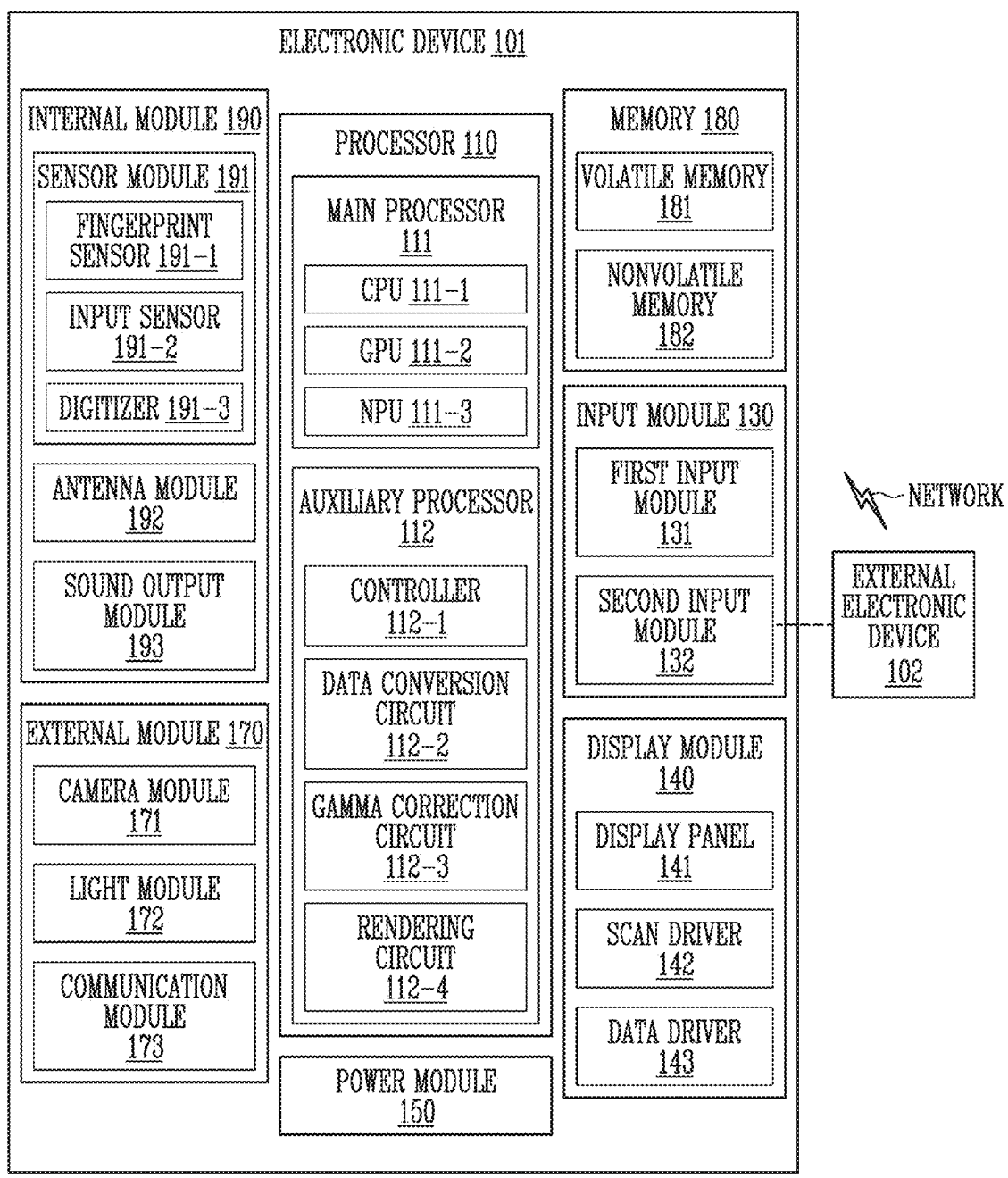
FIG. 17 is a block diagram of an electronic device according to an embodiment of the disclosure.

FIG. 17 is a block diagram of an electronic device 101 according to an embodiment of the disclosure.

The electronic device 101 outputs various pieces of information through a display module 140 in an operating system. When a processor 110 executes an application stored in a memory 180, the display module 140 provides application information to a user through a display panel 141. The display panel 141 may be implemented by the pixel unit 14. The display module 140 may further include the sensor 15 and the abnormal state sensor 16. A scan driver 142 of the display module 140 may be implemented by the scan driver 13. A data driver 143 of the display module 140 may be implemented by the data driver 12. The display module 140 may further include the timing controller 11.

The processor 110 obtains an external input through an input module 130 or a sensor module 191 and executes an application corresponding to the external input. For example, when the user selects a camera icon displayed on the display panel 141, the processor 110 obtains a user input through an input sensor 191-2 and activates a camera module 171. The processor 110 transmits image data corresponding to a captured image obtained through the camera module 171 to the display module 140. The display module 140 may display an image corresponding to the captured image through the display panel 141.

As another example, when personal information authentication is executed in the display module 140, a fingerprint sensor 191-1 obtains input fingerprint information as input data. The processor 110 compares input data obtained through the fingerprint sensor 191-1 with authentication data stored in the memory 180 and executes an application according to a comparison result. The display module 140 may display information executed according to a logic of the application through the display panel 141.

In still another example, when a music streaming icon displayed on the display module 140 is selected, the processor 110 obtains a user input through the input sensor 191-2 and activates a music streaming application stored in the memory 180. When a music execution command is input in the music streaming application, the processor 110 activates a sound output module 193 to provide sound information corresponding to the music execution command to the user.

In the above, an operation of the electronic device 101 is briefly described. Hereinafter, a configuration of the electronic device 101 is described in detail. Some of configurations of the electronic device 101 to be described later may be integrated and provided as one configuration, and one configuration may be separated into two or more configurations and provided.

Referring to FIG. 17, the electronic device 101 may communicate with an external electronic device 102 through a network (for example, a short-range wireless communication network or a long-range wireless communication network). According to an embodiment, the electronic device 101 may include the processor 110, the memory 180, the input module 130, the display module 140, a power module 150, an internal module 190, and an external module 170. According to an embodiment, in the electronic device 101, at least one of the above-described components may be omitted or one or more other components may be added. According to an embodiment, some of the above-described components (for example, the sensor module 191, an antenna module 192, or the sound output module 193) may be integrated into another component (for example, the display module 140).

The processor 110 may execute software to control at least another component (for example, a hardware or software component) of the electronic device 101 connected to the processor 110, and perform various data processing or operations. According to an embodiment, as at least a portion of the data processing or operation, the processor 110 may store a command or data received from another component (for example, the input module 130, the sensor module 191, or a communication module 173) in a volatile memory 181 and process the command or the data stored in the volatile memory 181, and result data may be stored in a nonvolatile memory 182.

The processor 110 may include a main processor 111 and an auxiliary processor 112. The main processor 111 may include one or more of a central processing unit (CPU) 111-1 or an application processor (AP). The main processor 111 may further include any one or more of a graphic processing unit (GPU) 111-2, a communication processor (CP), and an image signal processor (ISP). The main processor 111 may further include a neural processing unit (NPU) 111-3. The NPU is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 112 may include a controller 112-1. The controller 112-1 may include an interface conversion circuit and a timing control circuit. The controller 112-1 receives an image signal from the main processor 111, converts a data format of the image signal to correspond to an interface specification with the display module 140, and outputs image data. The controller 112-1 may output various control signals necessary for driving the display module 140.

The auxiliary processor 112 may further include a data conversion circuit 112-2, a gamma correction circuit 112-3, a rendering circuit 112-4, and the like. The data conversion circuit 112-2 may receive the image data from the controller 112-1, compensate the image data to display an image with a desired luminance according to a characteristic of the electronic device 101, a setting of the user, or the like, or convert the image data for reduction of power consumption, afterimage compensation, or the like. The gamma correction circuit 112-3 may convert the image data, a gamma reference voltage, or the like so that the image displayed on the electronic device 101 has a desired gamma characteristic. The rendering circuit 112-4 may receive the image data from the controller 112-1 and render the image data in consideration of a pixel disposition or the like of the display panel 141 applied to the electronic device 101. At least one of the data conversion circuit 112-2, the gamma correction circuit 112-3, and the rendering circuit 112-4 may be integrated into another component (for example, the main processor 111 or the controller 112-1). At least one of the data conversion circuit 112-2, the gamma correction circuit 112-3, and the rendering circuit 112-4 may be integrated into a data driver 143 to be described later.

The memory 180 may store various data used by at least one component (for example, the processor 110 or the sensor module 191) of the electronic device 101, and input data or output data for a command related thereto. The memory 180 may include at least one of the volatile memory 181 and the nonvolatile memory 182.

The input module 130 may receive a command or data to be used by a component (for example, the processor 110, the sensor module 191, or the sound output module 193) of the electronic device 101 from a source located outside (for example, the user or the external electronic device 102) of the electronic device 101.

The input module 130 may include a first input module 131 to which a command or data is input from the user and a second input module 132 to which a command or data is input from the external electronic device 102. The first input module 131 may include a microphone, a mouse, a keyboard, a key (for example, a button), or a pen (for example, a passive pen or an active pen). The second input module 132 may support a designated protocol capable of connecting to the external electronic device 102 by wire or wirelessly. According to an embodiment, the second input module 132 may include a high definition multimedia interface (HDMI), a universal serial bus (USB) interface, an SD card interface, or an audio interface. The second input module 132 may include a connector capable of physically connecting to the external electronic device 102, for example, an HDMI connector, a USB connector, an SD card connector, or an audio connector (for example, a headphone connector).

The display module 140 visually provides information to the user. The display module 140 may include the display panel 141, a scan driver 142, and the data driver 143. The display module 140 may further include a window, a chassis, and a bracket for protecting the display panel 141.

The display panel 141 may include a liquid crystal display panel, an organic light emitting display panel, or an inorganic light emitting display panel, and a type of the display panel 141 is not particularly limited. The display panel 141 may be a rigid type or a flexible type that may be rolled or folded. The display module 140 may further include a supporter, a bracket, a heat dissipation member, or the like that supports the display panel 141.

The scan driver 142 may be mounted on the display panel 141 as a driving chip. In addition, the scan driver 142 may be integrated in the display panel 141. For example, the scan driver 142 may include an amorphous silicon TFT gate driver circuit (ASG), a low temperature polycrystalline silicon (LTPS) TFT gate driver circuit, or an oxide semiconductor TFT gate driver circuit (OSG) built in the display panel 141. The scan driver 142 receives a control signal from the controller 112-1 and outputs the scan signals to the display panel 141 in response to the control signal.

The display panel 141 may further include an emission driver. The emission driver outputs an emission control signal to the display panel 141 in response to the control signal received from the controller 112-1. The emission driver may be formed separately from the scan driver 142 or integrated into the scan driver 142.

The data driver 143 receives the control signal from the controller 112-1, converts image data into an analog voltage (for example, a data voltage) in response to the control signal, and then outputs the data voltages to the display panel 141.

The data driver 143 may be integrated into another component (for example, the controller 112-1). A function of the interface conversion circuit and the timing control circuit of the controller 112-1 described above may be integrated into the data driver 143.

The display module 140 may further include the emission driver, a voltage generation circuit, and the like. The voltage generation circuit may output various voltages necessary for driving the display panel 141.

The power module 150 supplies power to a component of the electronic device 101. The power module 150 may include a battery that charges a power voltage. The battery may include a non-rechargeable primary cell, and a rechargeable secondary cell or fuel cell. The power module 150 may include a power management integrated circuit (PMIC). The PMIC supplies optimized power to each of the above-described module and a module to be described later. The power module 150 may include a wireless power transmission/reception member electrically connected to the battery. The wireless power transmission/reception member may include a plurality of antenna radiators of a coil form.

The electronic device 101 may further include the internal module 190 and the external module 170. The internal module 190 may include the sensor module 191, the antenna module 192, and the sound output module 193. The external module 170 may include the camera module 171, a light module 172, and the communication module 173.

The sensor module 191 may sense an input by a body of the user or an input by a pen among the first input module 131, and may generate an electrical signal or a data value corresponding to the input. The sensor module 191 may include at least one of the fingerprint sensor 191-1, the input sensor 191-2, and a digitizer 191-3.

The fingerprint sensor 191-1 may generate a data value corresponding to a fingerprint of the user. The fingerprint sensor 191-1 may include any one of an optical type fingerprint sensor or a capacitive type fingerprint sensor.

The input sensor 191-2 may generate a data value corresponding to coordinate information of the input by the body of the user or the pen. The input sensor 191-2 generates a capacitance change amount by the input as the data value. The input sensor 191-2 may sense an input by the passive pen or may transmit/receive data to and from the active pen.

The input sensor 191-2 may measure a biometric signal such as blood pressure, water, or body fat. For example, when the user touches a sensor layer or a sensing panel with a body part and does not move during a certain time, the input sensor 191-2 may sense the biometric signal based on a change of an electric field by the body part and output information desired by the user to the display module 140.

The digitizer 191-3 may generate a data value corresponding to coordinate information input by a pen. The digitizer 191-3 generates an electromagnetic change amount by an input as the data value. The digitizer 191-3 may sense an input by a passive pen or transmit or receive data to or from the active pen.

At least one of the fingerprint sensor 191-1, the input sensor 191-2, and the digitizer 191-3 may be implemented as a sensor layer formed on the display panel 141 through a successive process. The fingerprint sensor 191-1, the input sensor 191-2, and the digitizer 191-3 may be disposed on the display panel 141, and any one of the fingerprint sensor 191-1, the input sensor 191-3, and the digitizer 191-3, for example, the digitizer 191-3 may be disposed under the display panel 141.

At least two of the fingerprint sensor 191-1, the input sensor 191-2, and the digitizer 191-3 may be formed to be integrated into one sensing panel through the same process. When at least two of the fingerprint sensor 191-1, the photo sensor 1161-2, and the input sensor 191-2 are integrated into one sensing panel, the sensing panel may be disposed between the display panel 141 and a window disposed above the display panel 141. According to an embodiment, the sensing panel may be disposed on the window, and a position of the sensing panel is not particularly limited.

At least one of the fingerprint sensor 191-1, the input sensor 191-2, and the digitizer 191-3 may be embedded in the display panel 141. That is, at least one of the fingerprint sensor 191-1, the input sensor 191-2, and the digitizer 191-3 may be simultaneously formed through a process of forming elements (for example, a light emitting element, a transistor, and the like) included in the display panel 141.

In addition, the sensor module 191 may generate an electrical signal or a data value corresponding to an internal state or an external state of the electronic device 101. The sensor module 191 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 192 may include one or more antennas for transmitting a signal or power to an outside or receiving a signal or power from an outside. According to an embodiment, the communication module 173 may transmit a signal to an external electronic device or receive a signal from an external electronic device through an antenna suitable for a communication method. An antenna pattern of the antenna module 192 may be integrated into one configuration (for example, the display panel 141) of the display module 140 or the input sensor 191-2.

The sound output module 193 is a device for outputting a sound signal to an outside of the electronic device 101, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 193 may be integrated into the display module 140.

The camera module 171 may capture a still image and a moving image. According to an embodiment, the camera module 171 may include one or more lenses, an image sensor, or an image signal processor. The camera module 171 may further include an infrared camera capable of measuring presence or absence of the user, a position of the user, a gaze of the user, and the like.

The light module 172 may provide light. The light module 172 may include a light emitting diode or a xenon lamp. The light module 172 may operate in conjunction with the camera module 171 or may operate independently.

The communication module 173 may support establishment of a wired or wireless communication channel between the electronic device 101 and the external electronic device 102 and communication performance through the established communication channel. The communication module 173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 173 may communicate with the external electronic device 102 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 130, the sensor module 191, the camera module 171, and the like may be used to control an operation of the display module 140 in conjunction with the processor 110.

The processor 110 outputs a command or data to the display module 140, the sound output module 193, the camera module 171, or the light module 172 based on input data received from the input module 130. For example, the processor 110 may generate image data in response to the input data applied through a mouse, an active pen, or the like and output the image data to the display module 140, or generate command data in response to the input data and output the command data to the camera module 171 or the light module 172. When the input data is not received from the input module 130 during a certain time, the processor 110 may convert an operation mode of the electronic device 101 to a low power mode or a sleep mode to reduce power consumed in the electronic device 101.

The processor 110 outputs a command or data to the display module 140, the sound output module 193, the camera module 171, or the light module 172 based on sensing data received from the sensor module 191. For example, the processor 110 may compare authentication data applied by the fingerprint sensor 191-1 with authentication data stored in the memory 180 and then execute an application according to a comparison result. The processor 110 may execute the command based on sensing data sensed by the input sensor 191-2 or the digitizer 191-3, or output corresponding image data to the display module 140. When the sensor module 191 includes a temperature sensor, the processor 110 may receive temperature data for a measured temperature from the sensor module 191 and further perform luminance correction or the like on the image data based on the temperature data.

The processor 110 may receive measurement data for the presence of the user, the position of the user, the gaze of the user, and the like, from the camera module 171. The processor 110 may further perform luminance correction or the like on the image data based on the measurement data. For example, the processor 110 determining the presence or absence of the user through an input from the camera module 171 may output image data of which a luminance is corrected through the data conversion circuit 112-2 or the gamma correction circuit 112-3 to the display module 140.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 110 may communicate with the display module 140 through a mutually agreed interface, for example, may use any one of the above-described communication methods, and is not limited to the above-described communication method.

The electronic device 101 according to various embodiments disclosed in this document may be various types of devices. The electronic device 101 may include, for example, at least one of a portable communication device (for example, a smart phone), a computer device, a portable multimedia device, a portable medical device, a camera, a wearable device, or a home appliance. The electronic device 101 according to an embodiment of this document is not limited to the above-described devices.

The drawings referred to so far and the detailed description of the disclosure described herein are merely examples of the disclosure, are used for merely describing the disclosure, and are not intended to limit the meaning and the scope of the disclosure described in claims. Therefore, those skilled in the art will understand that various modifications and equivalent other embodiments are possible from these.

What is claimed is:

1. A display device comprising:
a display panel including pixels;
a first sensor configured to sense mobility of the pixels; and
a second sensor,
wherein the first sensor generates an initial sensing value using a first process to sense the mobility during a first period from a power-on time point of the display device to a display start time point, and generates a first sensing value using a second process to sense the mobility during a second period after the display start time point, and
wherein the second sensor senses whether the display panel is in an abnormal state based on the initial sensing value and the first sensing value.

2. The display device according to claim 1, wherein a processing time of the first process is shorter than a processing time of the second process.

3. The display device according to claim 1, further comprising:
a scan driver connected to the pixels through scan lines,
wherein the scan driver sequentially supplies scan signals to the scan lines while the first process is performed.

4. The display device according to claim 3, wherein the first sensor performs the second process during blank periods positioned between active periods, and
wherein the scan driver supplies the scan signals to the scan lines different from each other during the blank periods different from each other while the second process is performed.

5. The display device according to claim 4, further comprising:
a data driver connected to the pixels through data lines,
wherein the data driver first supplies sensing voltages to the data lines and then supplies data voltages to the data lines during each of the blank periods while the second process is performed.

6. The display device according to claim 5, wherein the data voltages supplied during the blank periods are the same as some of the data voltages supplied during previous active periods.

7. The display device according to claim 5, wherein the data driver successively supplies the sensing voltages and does not supply the data voltages while the first process is performed.

8. The display device according to claim 1, wherein the second sensor comprises a selection circuit configured to select one of a first mode and a second mode according to a number of times a process is performed to sense the mobility.

9. The display device according to claim 8, wherein the selection circuit selects the first mode when only the first process and the second process are performed, and selects the second mode when a process is performed to sense the mobility after the second process is performed.

10. The display device according to claim 9, wherein the second sensor further comprises a calculator calculating a difference value between the initial sensing value and the first sensing value during the first mode and calculating the difference value between sensing values generated in two recent mobility sensing processes during the second mode.

11. The display device according to claim 10, wherein the second sensor further comprises a first logic circuit designating corresponding pixels as abnormal pixel candidates when the difference value is greater than a first threshold value.

12. The display device according to claim 11, wherein the second sensor further comprises a second logic circuit determining the abnormal pixel candidates as abnormal pixels when sensing values corresponding to the abnormal pixel candidates are greater than a second threshold value.

13. The display device according to claim 12, wherein the second sensor further comprises a third logic circuit determining that the display panel is in the abnormal state when the number of the abnormal pixels is greater than a first count threshold value and determining that the display panel is in a normal state when the number of the abnormal pixels is less than the first count threshold value.

14. The display device according to claim 12, wherein the second further comprises:
- a first counter generating a first abnormal condition value when the number of the abnormal pixels is greater than a first count threshold value;
- a second counter generating a second abnormal condition value when the number of the abnormal pixels belonging to a first pixel group connected to different scan lines and one data line is greater than a second count threshold value; and
- a third counter generating a third abnormal condition value when the number of the abnormal pixels belonging to a second pixel group positioned in a partial area of the display panel and connected to a plurality of scan lines and a plurality of data lines is greater than a third count threshold value, and
- wherein the second sensor determines that the display panel is in the abnormal state when at least one of the first abnormal condition value, the second abnormal condition value, and the third abnormal condition value is generated.

15. A method of driving a display device, the method comprising:
- generating an initial sensing value using a first process to sense a mobility of pixels of a display panel of the display device during a first period from a power-on time point of the display device to a display start time point;
- generating a first sensing value using a second process to sense the mobility after the display start point; and
- sensing whether the display panel is in an abnormal state based on the initial sensing value and the first sensing value.

16. The method according to claim 15, wherein a processing time of the first process is shorter than a processing time of the second process.

17. The method according to claim 15, further comprising:
- sequentially supplying scan signals to scan lines connected to the pixels while the first process is performed.

18. The method according to claim 17, wherein the second process is performed during blank periods positioned between active periods, and
- the method further comprises supplying the scan signals to the scan lines different from each other during the blank periods different from each other while the first second process is performed.

19. The method according to claim 18, further comprising:
- supplying sensing voltages to data lines connected to the pixels during each of the blank periods while the second process is performed, and then, supplying data voltages to the data lines.

20. The method according to claim 19, wherein the data voltages supplied during the blank periods are the same as some of the data voltages supplied during previous active periods.

* * * * *